US011431122B2

United States Patent
Quan et al.

(10) Patent No.: US 11,431,122 B2
(45) Date of Patent: Aug. 30, 2022

(54) TAMPER RESISTANCE RECEPTACLE

(71) Applicant: The Wiremold Company, West Hartford, CT (US)

(72) Inventors: Yi Quan, Dongguan (CN); Xinguo Chang, Dongguan (CN)

(73) Assignee: THE WIREMOLD COMPANY, West Hartford, CT (US)

(*) Notice: Subject to any disclaimer, the term of this patent is extended or adjusted under 35 U.S.C. 154(b) by 0 days.

(21) Appl. No.: 17/139,134

(22) Filed: Dec. 31, 2020

(65) Prior Publication Data

US 2022/0209454 A1 Jun. 30, 2022

(51) Int. Cl.
  *H01R 13/44* (2006.01)
  *H01R 13/453* (2006.01)
  *H01R 24/20* (2011.01)
  *H01R 25/00* (2006.01)
  *H01R 103/00* (2006.01)

(52) U.S. Cl.
  CPC ......... *H01R 13/4534* (2013.01); *H01R 24/20* (2013.01); *H01R 25/003* (2013.01); *H01R 2103/00* (2013.01)

(58) Field of Classification Search
  CPC .............. H01R 13/4534; H01R 13/453; H01R 13/447; H01R 4424/20; H01R 25/003; H01R 2103/00
  USPC ........................................................ 439/137
  See application file for complete search history.

(56) References Cited

U.S. PATENT DOCUMENTS

| 6,893,275 B2 * | 5/2005 | Ng ...................... H01R 13/4534 439/137 |
| 7,452,221 B1 * | 11/2008 | Oddsen .................. H01R 24/78 439/137 |
| 7,510,412 B1 * | 3/2009 | Valentin ............. H01R 13/4534 439/137 |
| 7,588,447 B1 * | 9/2009 | Ni ...................... H01R 13/4534 439/137 |

(Continued)

OTHER PUBLICATIONS

Notification of Transmittal of the International Search Report and the Written Opinion of the International Searching Authority, or the Declaration dated Apr. 28, 2022, in connection with corresponding International Application No. PCT/US2021/065423; 17 pages.

*Primary Examiner* — Harshad C Patel

(74) *Attorney, Agent, or Firm* — McCormick, Paulding & Huber PLLC

(57) ABSTRACT

A tamper resistant electrical receptacle comprises a housing including a cover having at least one plug outlet formed therethrough, the plug outlet configured to receive both line and neutral blades of an electrical plug. The electrical receptacle further comprises electrical contacts positioned within the housing below the at least one plug outlet, the electrical contacts being configured to be connect to AC power. A shutter disposed within the housing between the cover and the electrical contacts is slidable between a closed position blocking access to the electrical contacts through the plug outlet and an open position allowing access to the electrical contacts through the plug outlet, the shutter being biased toward the closed position. The shutter is configured to slide from the closed position to the open position only upon simultaneous insertion of both the line and neutral blades of the electrical plug in the plug outlet.

16 Claims, 20 Drawing Sheets

(56) References Cited

U.S. PATENT DOCUMENTS

| | | | |
|---|---|---|---|
| 7,645,148 B2* | 1/2010 | Carbone | H01R 13/4534 |
| | | | 439/137 |
| 8,550,829 B2* | 10/2013 | Huang | H01R 13/4534 |
| | | | 439/145 |
| 9,059,529 B1* | 6/2015 | Lai | H01R 13/44 |
| 9,543,715 B2* | 1/2017 | Savicki, Jr. | H01R 25/006 |
| 9,647,375 B2* | 5/2017 | Lee | H01R 13/4534 |
| 9,735,493 B2* | 8/2017 | Lin | H01R 13/4534 |
| 10,424,863 B1* | 9/2019 | Zhuang | H01R 13/4532 |
| 10,804,638 B1* | 10/2020 | Li | H01R 13/4534 |
| 2003/0017731 A1* | 1/2003 | Huang | H01R 13/4534 |
| | | | 439/137 |
| 2005/0026482 A1* | 2/2005 | Huang | H01R 13/4536 |
| | | | 439/145 |
| 2009/0227131 A1* | 9/2009 | Carbone | H01R 13/4534 |
| | | | 439/149 |
| 2010/0041259 A1* | 2/2010 | Ni | H01R 13/4534 |
| | | | 439/137 |
| 2011/0104918 A1* | 5/2011 | Chen | H01R 13/4534 |
| | | | 439/136 |
| 2015/0064944 A1* | 3/2015 | Scanzillo | H01R 13/4534 |
| | | | 439/137 |
| 2015/0380856 A1 | 12/2015 | Mortun et al. | |
| 2016/0104961 A1 | 4/2016 | Savicki, Jr. | |

* cited by examiner

TAMPER RESISTANCE RECEPTACLE

TECHNICAL FIELD

This present disclosure relates to electrical receptacles.

BACKGROUND

Electrical receptacles are used to provide alternating current (AC) power in buildings and various other locations. Standard electrical receptacles present a risk of injury due to electrical shock and/or fire if something is stuck into one of the slots of the electrical outlet, which can be particularly problematic for children who are not aware of the dangers associated with electricity and electrical outlets. Therefore, in order to prevent and/or minimize such risks, UL requirements and many building codes require tamper resistant electrical receptacles be installed in many applications.

SUMMARY

The present disclosure provides an improved tamper resistant electrical receptacle. The tamper resistant electrical receptacle comprises a housing including a cover having at least one plug outlet formed therethrough. The plug outlet is configured to receive blades of an electrical plug. Electrical contacts are positioned within the housing below the at least one plug outlet, the electrical contacts being configured to be connect to AC power. A shutter is disposed within the housing between the cover and the electrical contacts and is slidable between a closed position blocking access to the electrical contacts through the plug outlet and an open position allowing access to the electrical contacts through the plug outlet. The shutter is biased toward the closed position and is configured to slide from the closed position to the open position only upon simultaneous insertion of both blades of the electrical plug in the plug outlet.

According to the present disclosure, a spring member may bias the shutter toward the closed position.

According to the present disclosure, the tamper resistant electrical receptacle further comprises a frame positioned within the housing between the electrical contacts and the cover. The shutter is located between the frame and the cover and is slidable along an upper surface of the frame between the closed position and the open position. The frame may comprise openings corresponding to the plug outlet. The frame may include a first longitudinal guide channel formed in the upper surface thereof, the first longitudinal guide channel having an axis located between the openings in the frame corresponding to the plug outlet. The shutter may comprise a lower guide rib formed on its bottom surface, the lower guide rib extending downward into the first longitudinal guide channel and being slidable therein. According to the present disclosure, the axis of the first longitudinal guide channel may equidistant between the openings in the frame corresponding to the plug outlet.

According to the present disclosure, the cover may include a second longitudinal guide channel formed on the lower surface thereof, the second longitudinal guide channel having an axis located between the plug outlet openings formed in the cover, and the shutter may comprise an upper guide rib formed on its top surface, the upper guide rib extending upward into the second longitudinal guide channel and being slidable therein.

According to the present disclosure, the shutter may further comprise a first end configured to contact the housing in the closed position, a second end contacting the spring member biasing the shutter toward the closed position, and at least one sloped surface on either side of the lower guide rib, each sloped surface sloping downward from the second end toward the first end.

The shutter may also comprise first and second support ribs extending downward from the bottom surface of the shutter, the first support rib being located between the lower guide rib and the at least one sloped surface on one side of the lower guide rib, and the second support rib being located between the lower guide rib and the at least one sloped surface on the other side of the lower guide rib. The first and second support ribs may be configured to slide along the upper surface of the frame upon simultaneous insertion of both blades of an electrical plug in the plug outlet and to form pivots about which the shutter tilts upon insertion of only one blade into the plug outlet. According to the present disclosure, the frame and the housing may include a plurality of stop ribs configured to contact the shutter upon tilting thereof, the contact preventing the shutter from sliding from the closed position to the open position.

According to the present disclosure, a tamper resistant electrical receptacle comprises a housing defining a hollow interior. The housing includes a cover having at least one plug outlet formed therethrough configured to receive blades of an electrical plug. The tamper resistant electrical receptacle further comprises electrical contacts positioned within the hollow interior below the at least one plug outlet, a frame positioned within the hollow interior between the electrical contacts and the cover, the frame comprising openings corresponding to the at least one plug outlet, and a shutter disposed between the frame and the cover, the shutter being slidable along an upper surface of the frame between a closed position blocking the openings of the frame and an open position. The tamper resistant electrical receptacle may also comprise a spring member biasing the shutter toward the closed position. The shutter is configured to slide from the closed position to the open position only upon simultaneous insertion of both blades of the electrical plug in the plug outlet.

According to the present disclosure, the frame may include a first longitudinal guide channel formed in the upper surface thereof, and the shutter may comprise a lower guide rib formed on its bottom surface, the lower guide rib extending downward into the first longitudinal guide channel and being slidable therein. An axis of the first longitudinal guide channel may be equidistant between the openings in the frame. The cover may include a second longitudinal guide channel formed on the lower surface thereof, and the shutter may comprise an upper guide rib formed on its top surface, the upper guide rib extending upward into the second longitudinal guide channel and being slidable therein. An axis of the second longitudinal guide channel may be equidistant between the plug outlet openings formed in the cover.

According to the present disclosure, the shutter may further comprise a first end configured to contact the housing in the closed position, a second end contacting the spring member biasing the shutter toward the closed position, and at least one sloped surface on either side of the lower guide rib, each sloped surface sloping downward from the second end toward the first end.

The shutter may also comprise first and second support ribs extending downward from the bottom surface of the shutter, the first support rib being located between the lower guide rib and the at least one sloped surface on one side of the lower guide rib, and the second support rib being located between the lower guide rib and the at least one sloped surface on the other side of the lower guide rib. The first and second support ribs may be configured to slide along the upper surface of the frame upon simultaneous insertion of both blades of the electrical plug in the plug outlet and to form pivots about which the shutter tilts upon insertion of only one blade into the plug outlet. According to the present disclosure, the frame and the housing may include a plurality of stop ribs configured to contact the shutter upon tilting thereof, the contact preventing the shutter from sliding from the closed position to the open position.

According to the present disclosure, a tamper resistant electrical receptacle comprises a housing defining a hollow interior, the housing including a cover having first and second plug outlets formed therethrough configured to receive blades of electrical plugs. The tamper resistant electrical receptacle further comprises electrical contacts positioned within the hollow interior below the first and second plug outlets, a frame positioned within the hollow interior between the electrical contacts and the cover, the frame comprising openings corresponding to the first and second plug outlets, and first and second shutters disposed between the frame and the cover. Each of the first and second shutters is slidable along an upper surface of the frame between a closed position blocking the openings of the frame corresponding to one of the first and second plug outlets and an open position. The tamper resistant electrical receptacle may also comprise spring members biasing the first and second shutters toward the closed position. Each of the first and second shutters is configured to slide from the closed position to the open position only upon insertion of both blades of an electrical plug in the respective first or second plug outlet.

According to the present disclosure, the frame may include a first longitudinal guide channel and a second longitudinal guide channel formed in the upper surface thereof, the first longitudinal guide channel having a first axis located between the openings in the frame corresponding to the first plug outlet and the second longitudinal guide channel having a second axis located between the openings in the frame corresponding to the second plug outlet. The first shutter may comprise a first lower guide rib formed on its bottom surface, the first lower guide rib extending downward into the first longitudinal guide channel and being slidable therein. The second shutter may comprise a second lower guide rib formed on its bottom surface, the second lower guide rib extending downward into the second longitudinal guide channel and being slidable therein. The axes of the first and second longitudinal guide channels may be equidistant between the openings in the frame.

According to the present disclosure, each shutter of the first and second shutters may comprise a first end, a second end contacting a spring member of the spring members, and at least one sloped surface on either side of the lower guide rib, each sloped surface sloping downward from the second end toward the first end. Each shutter may also comprise first and second support ribs extending downward from the bottom surface of the shutter, the first support rib being located between the lower guide rib and the at least one sloped surface on one side of the lower guide rib, and the second support rib being located between the lower guide rib and the at least one sloped surface on the other side of the lower guide rib. The first and second support ribs may be configured to slide along the upper surface of the frame upon simultaneous insertion of two blades of the electrical plug in the plug outlet and to form pivots about which the respective first or second shutter tilts upon insertion of only one blade into the plug outlet. The frame and the housing may include a plurality of stop ribs configured to contact the first and second shutters upon tilting thereof, the contact preventing the shutters from sliding from the closed position to the open position.

These and other objects, features and advantages of the present disclosure will become apparent in light of the detailed description of embodiments thereof, as illustrated in the accompanying drawings.

DETAILED DESCRIPTION

Before the various embodiments are described in further detail, it is to be understood that the invention is not limited to the particular embodiments described. It will be understood by one of ordinary skill in the art that the article feeding device described herein may be adapted and modified as is appropriate for the application being addressed and that the components of the article feeding device described herein may be employed in other suitable applications, and that such other additions and modifications will not depart from the scope thereof.

Figure 1:
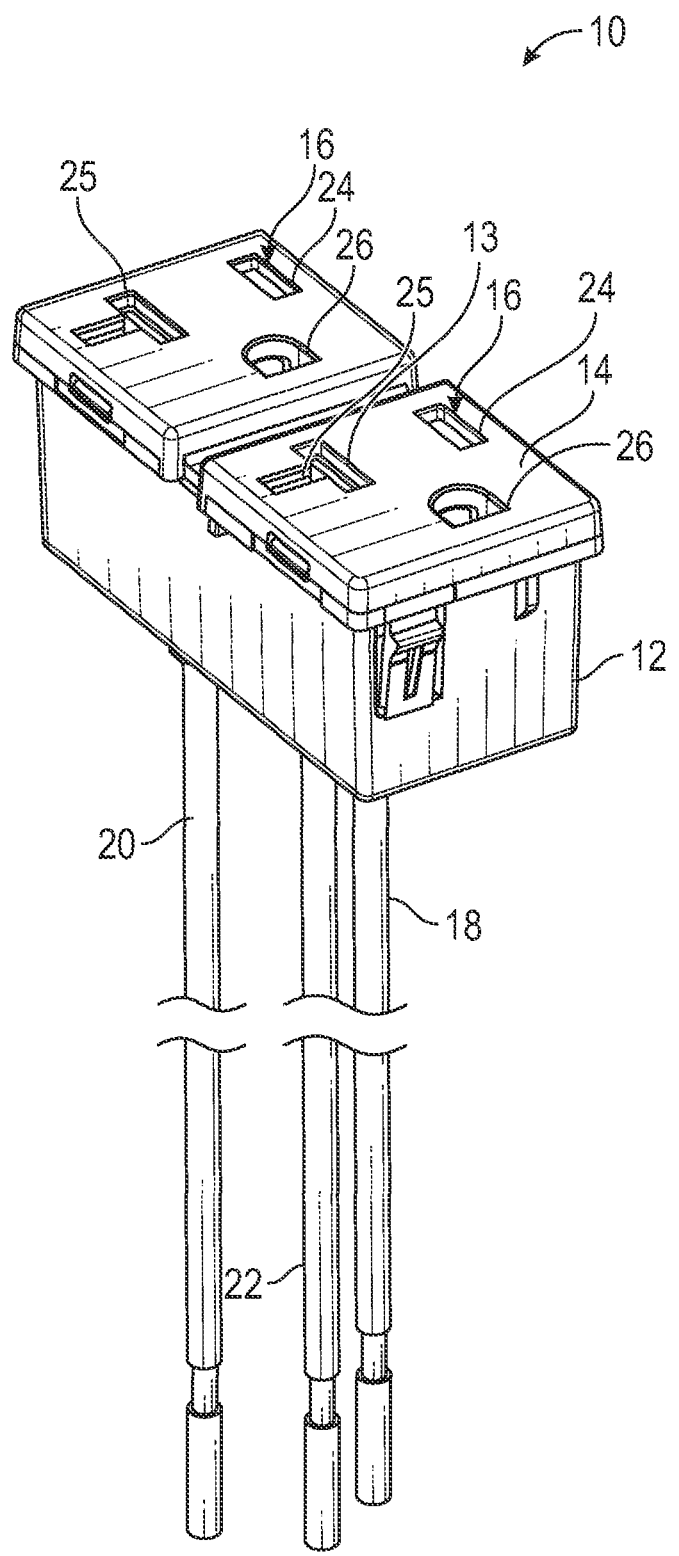
FIG. 1 is a front, top, right-hand side perspective view of a tamper resistant electrical receptacle according to the present disclosure.

Referring to FIG. 1, a tamper resistant electrical receptacle 10 according to the present disclosure is shown. The tamper resistant electrical receptacle 10 includes a housing 12 with a cover 14 having at least one plug outlet 16 formed therethrough. The receptacle 10 is configured to connect to alternating current (AC) power through a line conductor wire 18, a neutral conductor wire 20, and a ground wire 22 and to provide the AC power to electrical plugs properly connected to the plug outlets 16. As shown, the tamper resistant electrical receptacle 10 is a duplex receptacle including two plug outlets 16. However, it should be readily understood that the tamper resistant electrical receptacle 10 of the present disclosure could be any other electrical receptacle, such as a single outlet receptacle.

Each plug outlet 16 includes openings through the cover 14 arranged in a standard plug configuration necessary to receive blades of an electrical plug. For example, as shown, each plug outlet 16 is includes a line conductor opening 24, a neutral conductor opening 25, and a ground opening 26. The receptacle 10 is shown as a 20 amp receptacle, such as a 5-20R receptacle, with the line conductor opening 24 formed as a slot for receiving a line blade 27, shown in FIG. 11, of the electrical plug, the neutral conductor opening 25 having a T-shape for receiving either a standard 20 amp or 15 amp neutral blade 28, shown in FIG. 11, of the electrical plug, and the ground opening 26 configured to receive a ground prong 29, shown in FIG. 11, of the electrical plug. However, the tamper resistant receptacle 10 according to the present disclosure may be formed as a 15 amp receptacle, wherein the line conductor opening 24 and the neutral conductor opening 25 are formed as two parallel slotted openings.

Figure 2:
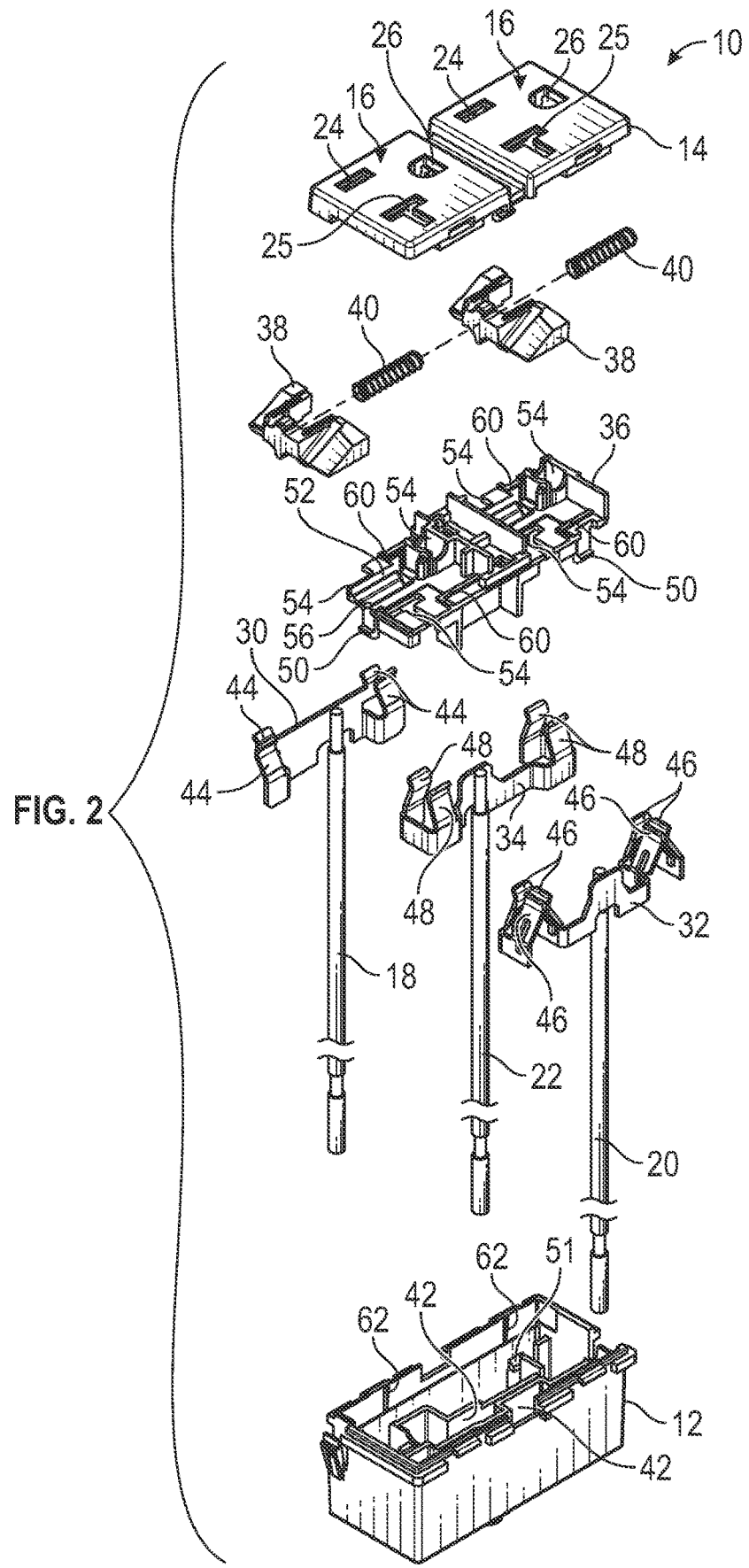
FIG. 2 is a front, top, left-hand side exploded perspective view of the tamper resistant electrical receptacle of FIG. 1.

Referring to FIG. 2, the tamper resistant electrical receptacle 10 further includes a line contact strip 30, a neutral contact strip 32, and a ground contact strip 34 disposed within the housing 12. A frame 36 is positioned within the housing 12 above the line contact strip 30, neutral contact strip 32, and ground contact strip 34. Shutters 38, one for each plug outlet 16, are disposed within the housing 12 between the cover 14 and the frame 36. Each shutter 38 is slidable between a closed position, in which access to the line contact strip 30 and neutral contact strip 32 through the respective plug outlet 16 is blocked, and an open position, in which access to the line contact strip 30 and neutral contact strip 32 through the respective plug outlet 16 is permitted. A spring 40 biases each shutter 38 toward the closed position.

Figure 3:
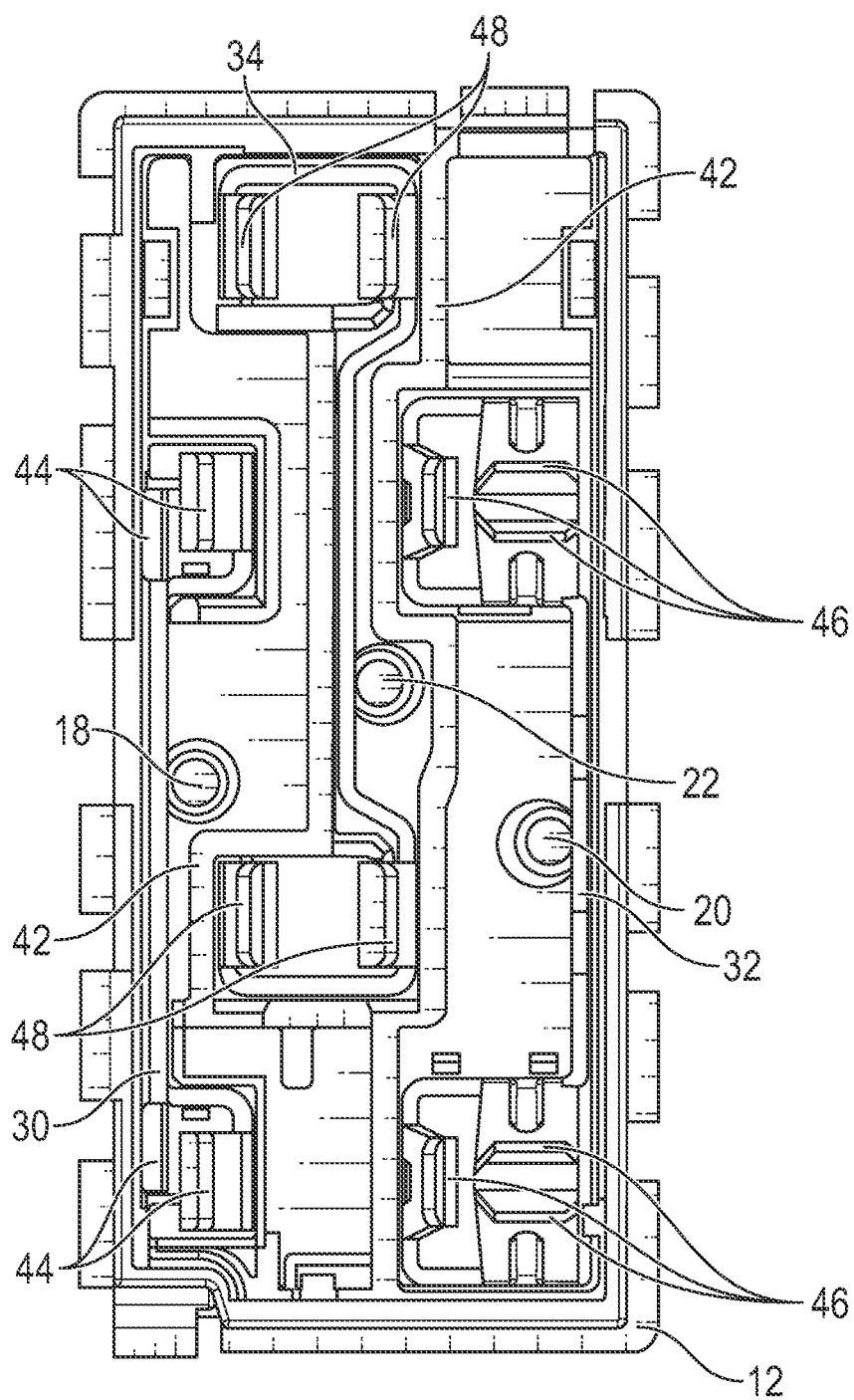
FIG. 3 is a top view of a portion of the tamper resistant electrical receptacle device of FIG. 1.

Still referring to FIG. 2 and also to FIG. 3, the line contact strip 30, neutral contact strip 32, and ground contact strip 34 are disposed within the housing 12 proximate the bottom thereof and are electrically isolated from one another, for example, by dividers 42 of the like. The line contact strip 30 includes upward extending contact arms 44 located beneath the line conductor opening 24 of each plug outlet 16. The contact arms 44 are configured to engage the line blade of a plug when properly installed in the plug outlet 16. The neutral contact strip 32 includes upward extending contact arms 46 located beneath the neutral conductor opening 25 of each plug outlet 16. The contact arms 46 are configured to engage the neutral blade of a plug when properly installed in the plug outlet 16. The ground contact strip 34 includes upward extending contact arms 48 located beneath the ground opening 26 of each plug outlet 16. The contact arms 48 are configured to engage the ground prong 29, shown in FIG. 11, of a plug when properly installed in the plug outlet 16. The line contact strip 30, neutral contact strip 32, and ground contact strip 34 are respectively connected to the line conductor wire 18, neutral conductor wire 20, and ground wire 22. As shown, the line conductor wire 18, neutral conductor wire 20, and ground wire 22 are pre-wired in receptacle 10, being welded to the respective contact strips, and extend outward from the bottom of the housing 12. However, the receptacle 10 may be configured with other known wire connection methods such as insulation displacement connections, push-in connections, or the like. The line conductor wire 18, neutral conductor wire 20, and ground wire 22 are configured to connect to an AC power source to provide AC power to the receptacle 10.

Figure 4:
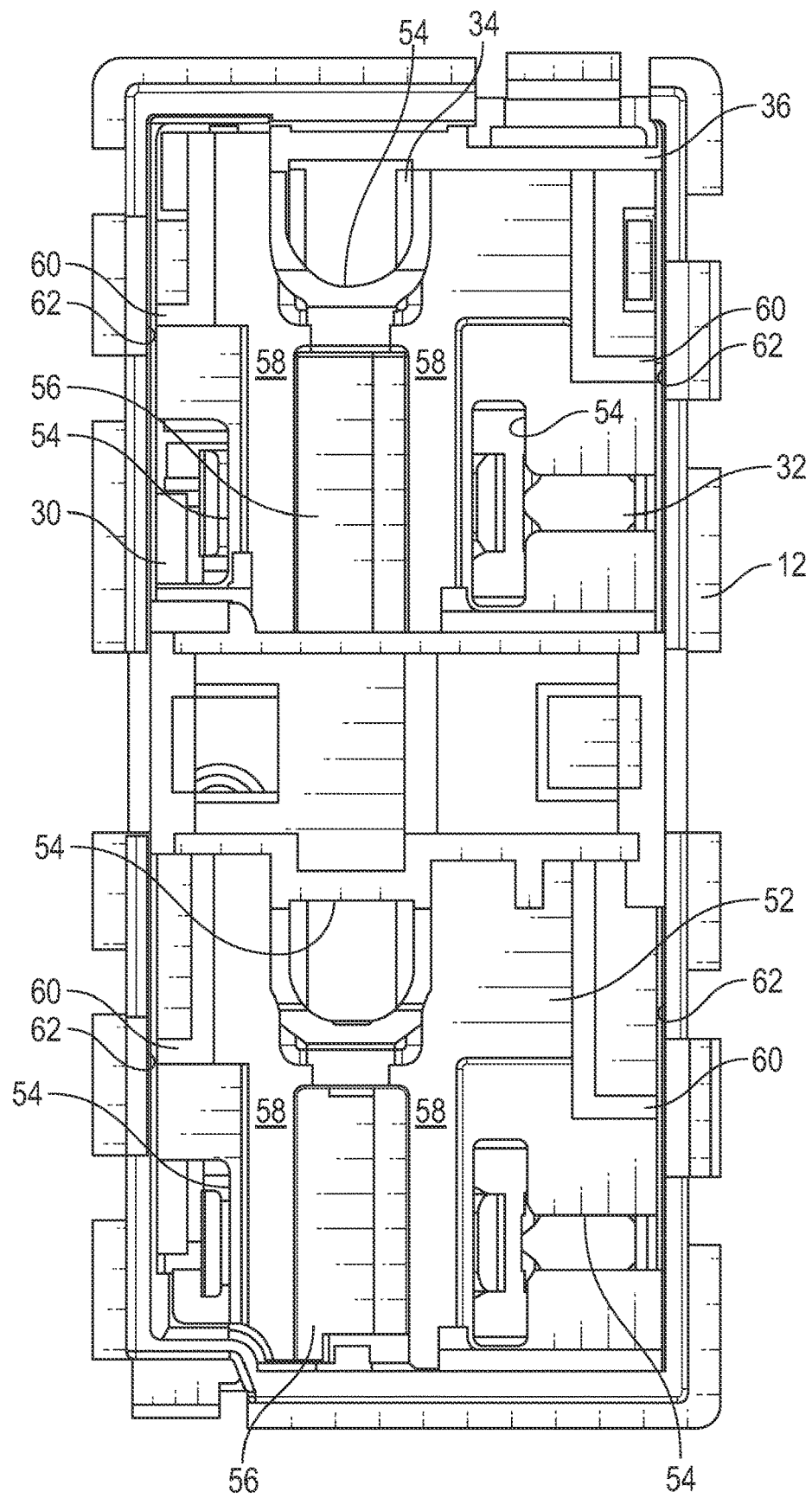
FIG. 4 is a top view of a portion of the tamper resistant electrical receptacle device of FIG. 1.

Referring to FIG. 2 and also to FIG. 4, the frame 36 includes a plurality of locking tabs 50 that engage corresponding locking features 51 of the housing 12, shown in FIG. 2, to secure the frame 36 in position within the housing 12 above the line contact strip 30, neutral contact strip 32, and ground contact strip 34. The frame 36 defines an upper support surface 52 configured to support the shutters 38 thereon, and has cutaway openings 54 extending through a thickness of the frame 36, the cutaway openings 54 corresponding to the line conductor opening 24, neutral conductor opening 25, and ground opening 26 of each plug outlet 16. For each plug outlet 16, the upper support surface 52 includes a first longitudinal guide channel 56 formed in the upper support surface 52 between the cutaway openings 54 corresponding to the line conductor opening 24 and neutral conductor opening 25. The first longitudinal guide channel 56 has an axis equidistant between the cutaway openings 54 corresponding to the line conductor opening 24 and neutral conductor opening 25 and extends toward the cutaway openings 54 corresponding to the ground opening 26. The upper support surface 52 is flat in an area 58 surrounding the first longitudinal guide channel 56 between the guide channel 56 and the cutaway openings 54 corresponding to the line conductor opening 24 and neutral conductor opening 25 and extending past the ground opening 26. The frame 36 also comprises raised stop ribs 60 projecting upward from the upper support surface 52 proximate the side edges of the frame 36, the raised stop ridges being located, in the direction of the axis of the first longitudinal guide channel 56, between the cutaway openings 54 corresponding to the line conductor opening 24 and neutral conductor opening 25 and the cutaway opening 54 corresponding to the ground opening 26. The housing 12 includes similar stop ribs 62 extending inward from an inner surface of the housing 12, the stop ribs 62 of the housing 12 being adjacent to and aligned with the stop ribs 60 of the frame 36.

Figure 5:
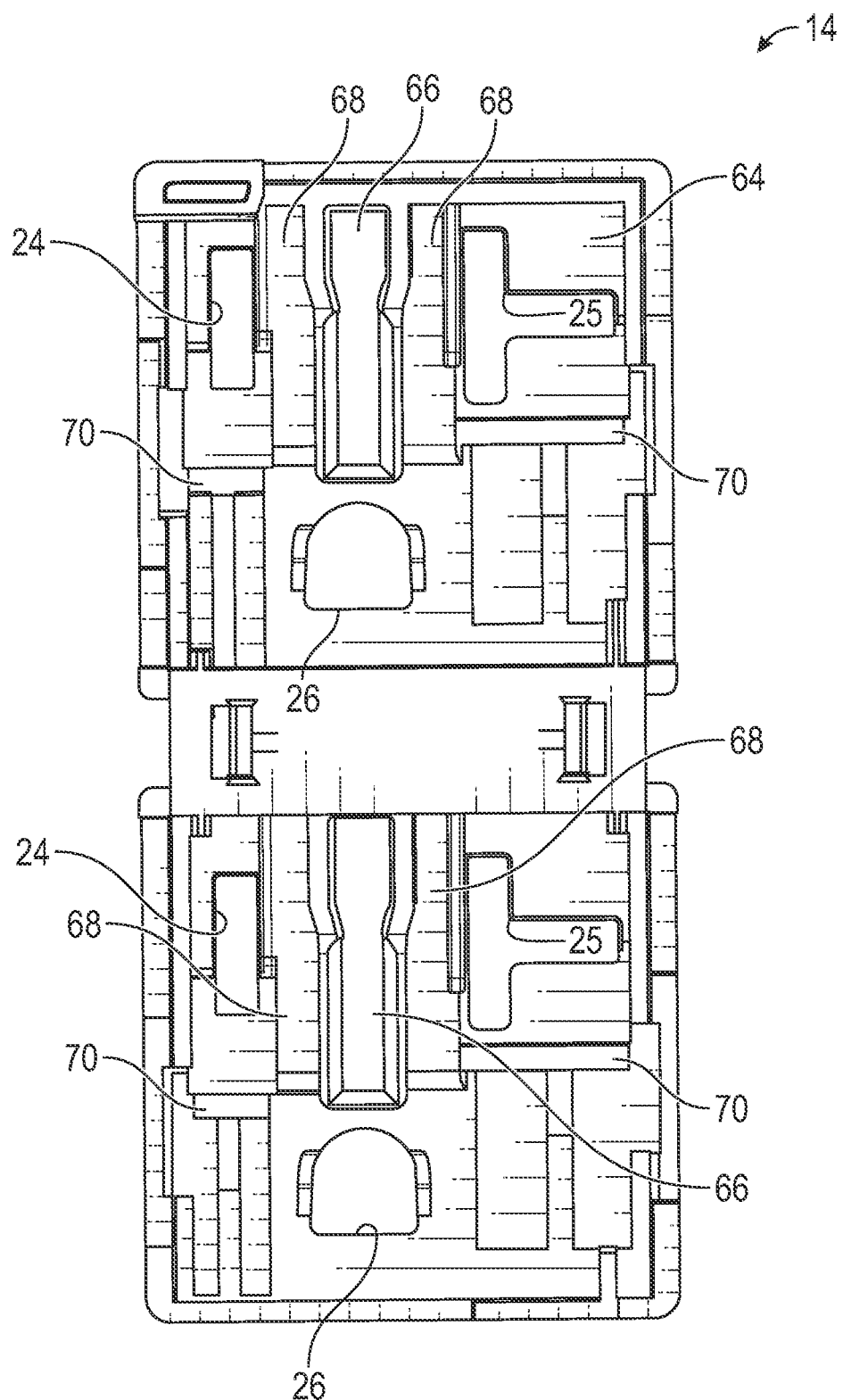
FIG. 5 is a bottom view of a cover of the tamper resistant electrical receptacle device of FIG. 1.
Figure 6:
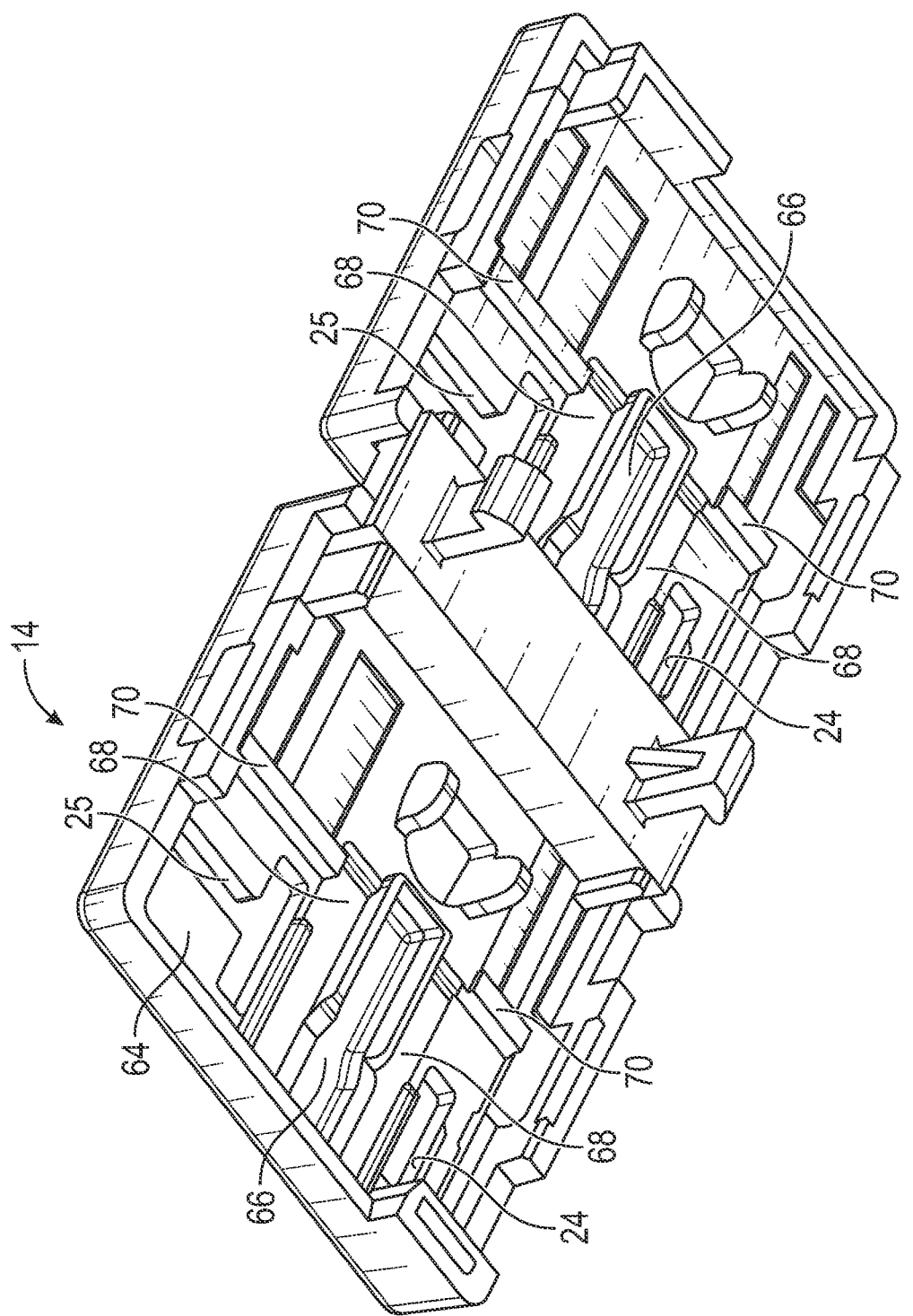
FIG. 6 is a bottom, front, left-hand side perspective view of the cover of FIG. 5.
Figure 7:
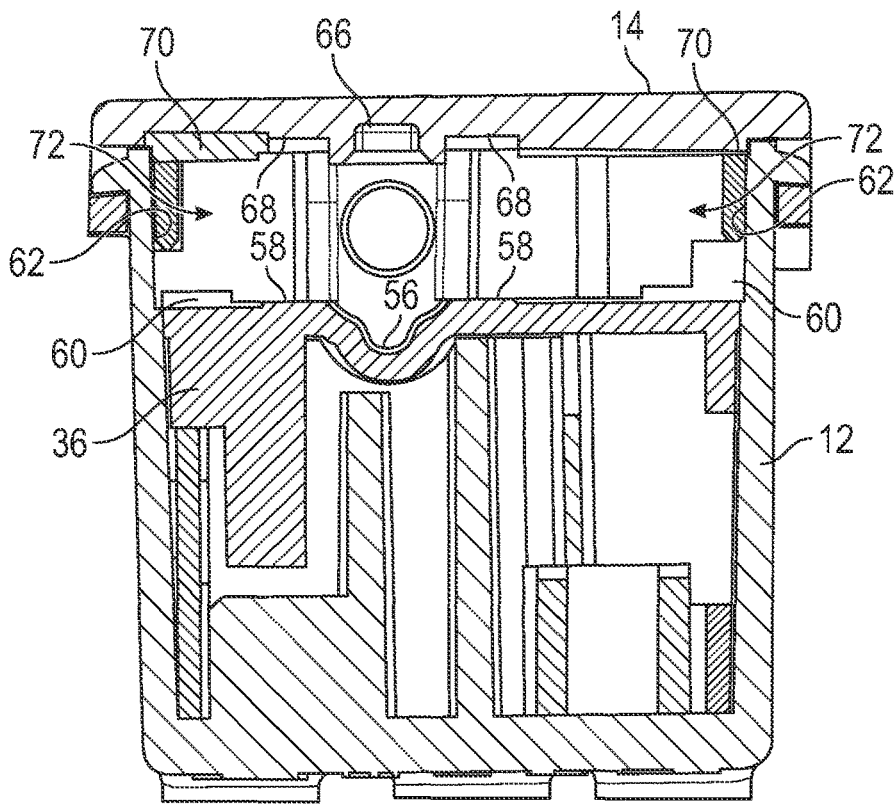
FIG. 7 is a left-hand side cross-sectional view of the tamper resistant electrical receptacle of FIG. 1.

Referring to FIGS. 5 and 6, an underside 64 of the cover 14 includes a second longitudinal guide channel 66 formed between the line conductor opening 24 and neutral conductor opening 25 of each plug outlet 16. Each second longitudinal guide channel 64 is located above the first longitudinal guide channel 56 of the frame 36, shown in FIG. 4, and, similar to the first longitudinal guide channels 56, each second longitudinal guide channel 64 of the cover 12 has an axis equidistant between the line conductor opening 24 and neutral conductor opening 25 and extends toward the ground opening 26. Underside 64 is flat in an area 68 surrounding the second longitudinal guide channel 66 between the guide channel 66 and the line conductor opening 24 and neutral conductor opening 25 and extending past the ground opening 26. The cover 12 also includes raised stop ribs 70 projecting downward from the underside 64 in line with the line conductor opening 24 and neutral conductor opening 25, the raised stop ribs 70 being located, in the direction of the axis of the second longitudinal guide channel 64, between the line conductor opening 24 and neutral conductor opening 25 and the ground opening 26. The stop ribs 70 of the cover 14 are adjacent to and aligned with the stop ribs 60 of the frame 36 and the stop ribs 62 of the housing 12. As seen in FIG. 7, the stop ribs 60 of the frame 36, stop ribs 62 of the housing 12, and stop ribs 70 of the cover 14, together, frame shutter passages 72 on either side of the first and second longitudinal guide channels 56 and 66 and flat areas 58 and 68 of the frame 36 and cover 14.

Figure 8:
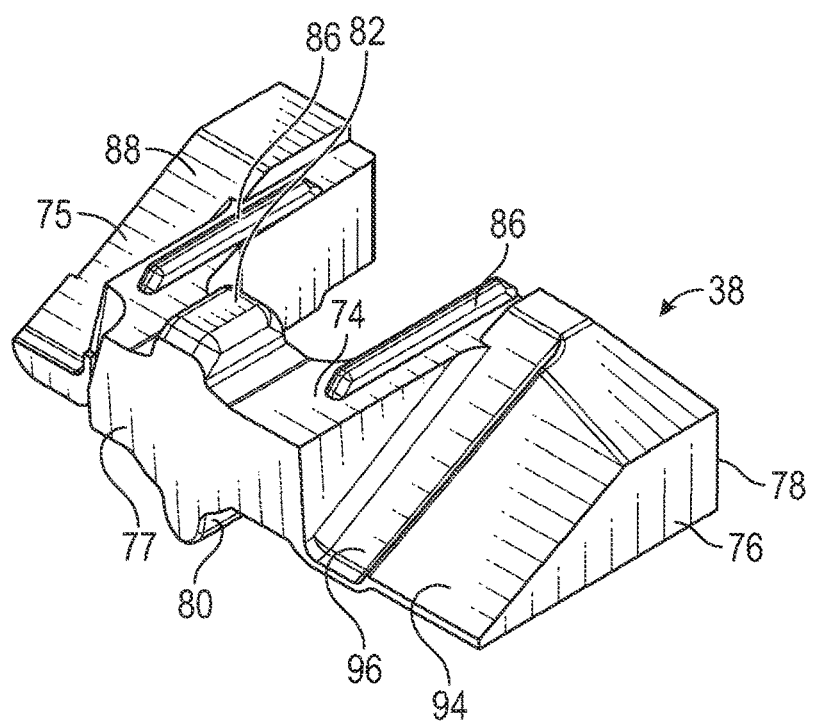
FIG. 8 is a front, top left-hand side perspective view of a shutter of the tamper resistant electrical receptacle of FIG. 1.
Figure 9:
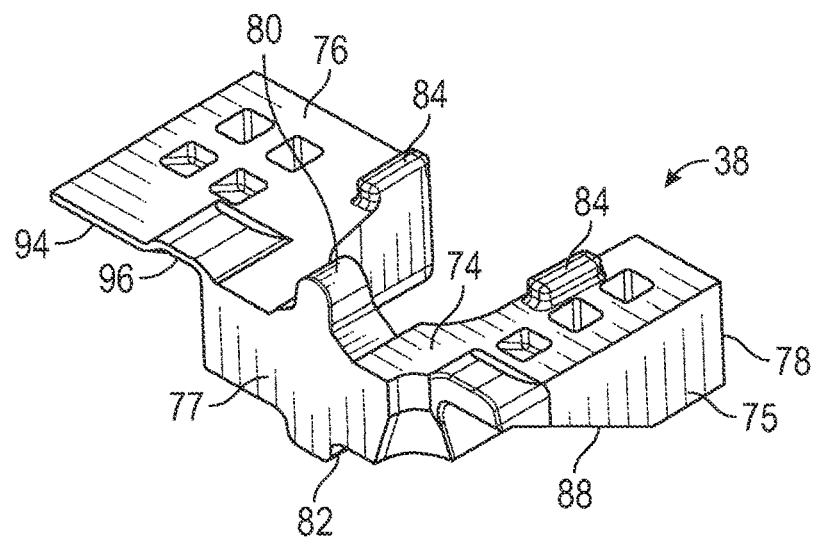
FIG. 9 is a bottom, rear left-hand side perspective view of the shutter of FIG. 8.

Referring to FIGS. 8 and 9, an exemplary shutter 38 according to the present disclosure is shown. The shutter 38 includes a central body portion 74 with a line side blocking portion 75 and a neutral side blocking portion 76 formed on either side thereof and extending between a front end 77 and a back end 78 of the shutter. The central body portion 74 has a lower guide rib 80 extending downward therefrom and an upper guide rib 82 extending upward from the central body portion 74 opposite the lower guide rib 80. A lower surface of the central body portion 74 also includes parallel support ribs 84 flanking the lower guide rib 80 and offset from the lower guide rib 80 in a direction toward the back end 78. Similarly, an upper surface of the central body portion 74 includes parallel support ribs 86 flanking the upper guide rib 82. The line side blocking portion 75 includes a sloped upper surface 88 that slopes downward in a direction from a back end 78 to a front end 77 of the shutter 38. The neutral side blocking portion 76, likewise, includes a sloped upper surface 94 that slopes downward in the direction from the back end 78 to the front end 77 of the shutter 38. The neutral side blocking portion 76 may also include a sloped trough 96 proximate the central body portion 74, the sloped trough 96 also sloping downward in the direction from the back end 78 to the front end 77 of the shutter 38.

Figure 10:
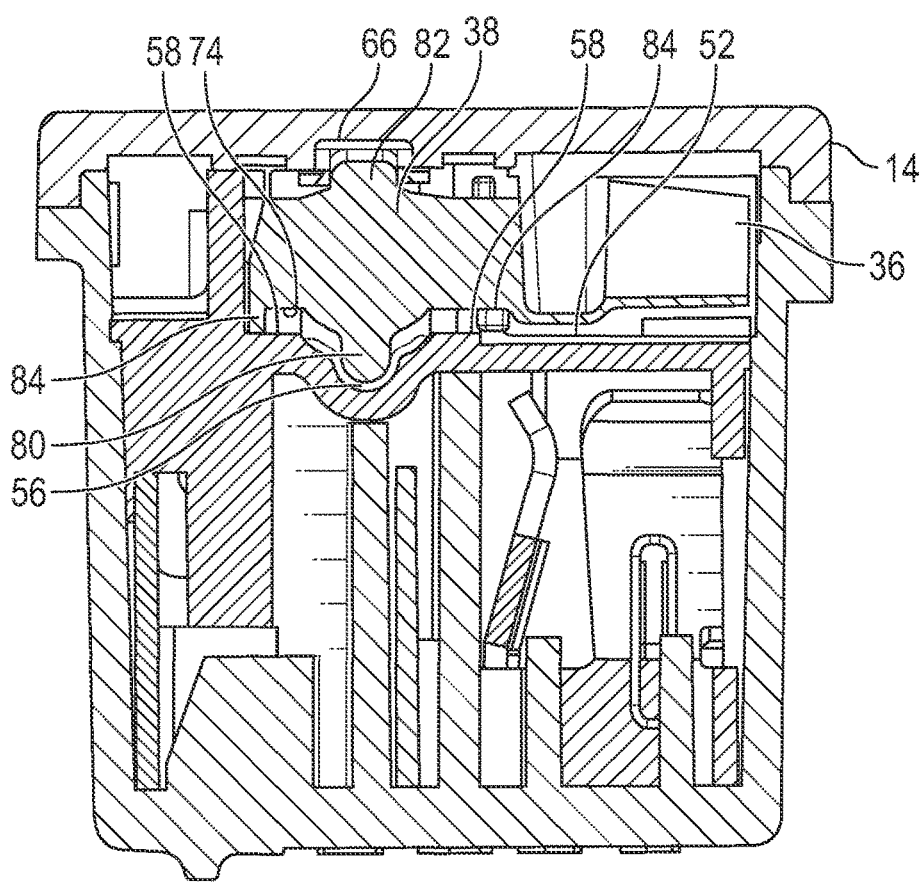
FIG. 10 is a left-hand side cross-sectional view of the tamper resistant electrical receptacle of FIG. 1.

As seen in FIG. 10, the shutter 38 is located between the frame 36 and the cover 14, with the lower guide rib 80 extending downward into the first longitudinal guide channel 56 of the frame 36, the upper guide rib 82 extending upward into the second longitudinal guide channel 66 of the cover 14, and the support ribs 84 on the lower surface of the central body portion 74 resting on the flat areas 58 of the upper support surface 52 of the frame 36.

Figure 11:
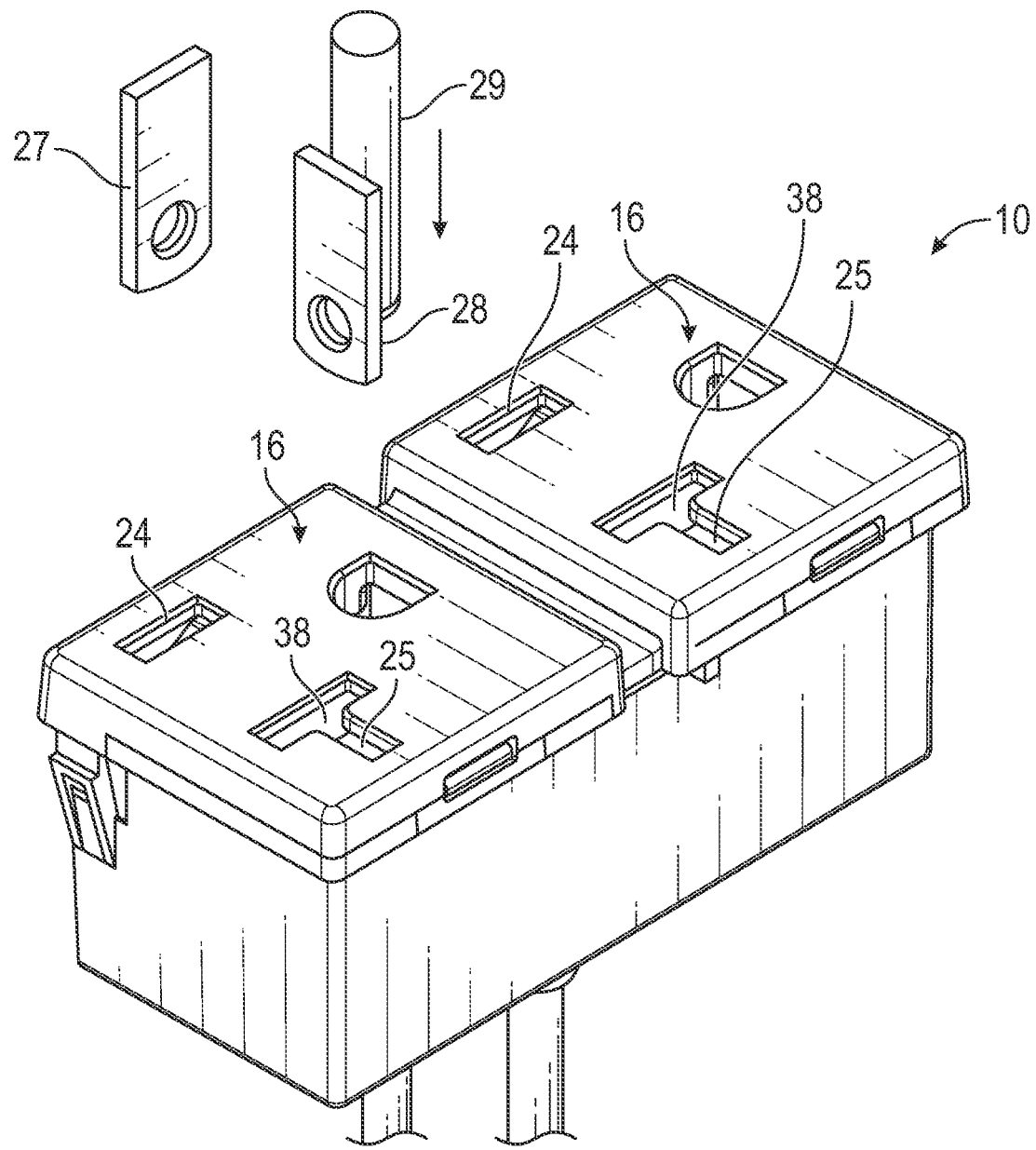
FIG. 11 is a front, top, left-hand side perspective view of the tamper resistant electrical receptacle of FIG. 1.
Figure 12:
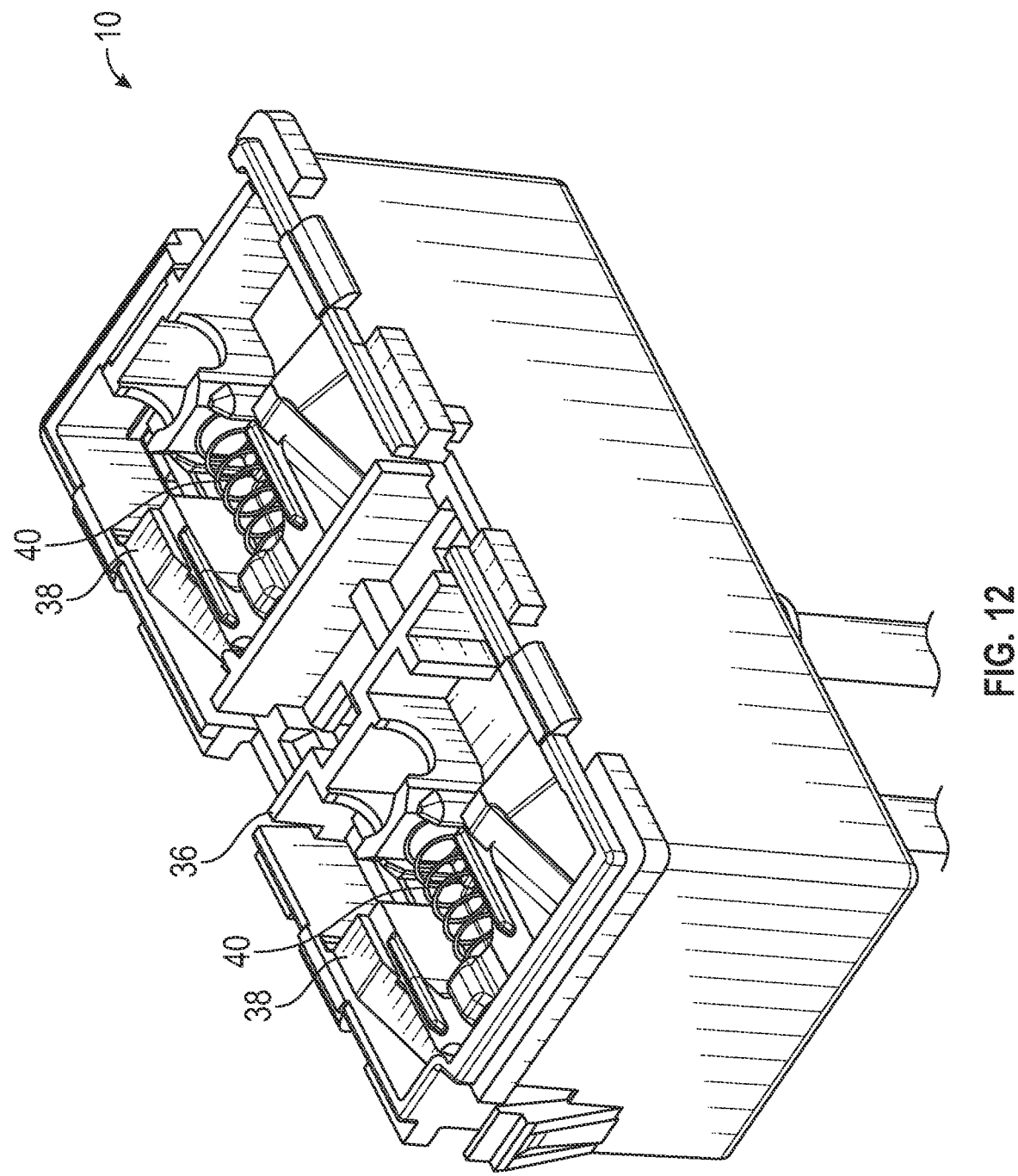
FIG. 12 is a front, top, left-hand side perspective view of the tamper resistant electrical receptacle of FIG. 1 with the cover removed.

In operation, with reference to FIGS. 11 and 12, the receptacle 10 is shown prior to insertion of the line blade 27, neutral blade 28 and ground prong 29 of a 5-20P electrical plug. Each shutter 38 is in the closed position between the line conductor opening 24 and neutral conductor opening 25 of the respective plug outlet 16, and the cutaway openings 54, shown in FIG. 5, corresponding to the respective line conductor opening 24 and neutral conductor opening 25 formed in the frame 36. In this closed position, the shutter 38 blocks access to the contact arms 44 and 46 of the line contact strip 30 and neutral contact strip 32, shown in FIG. 4, located below the cutaway openings 54, shown in FIG. 5. The springs 40 bias the shutters 38 toward the closed position, as shown in FIG. 12.

Figure 13:
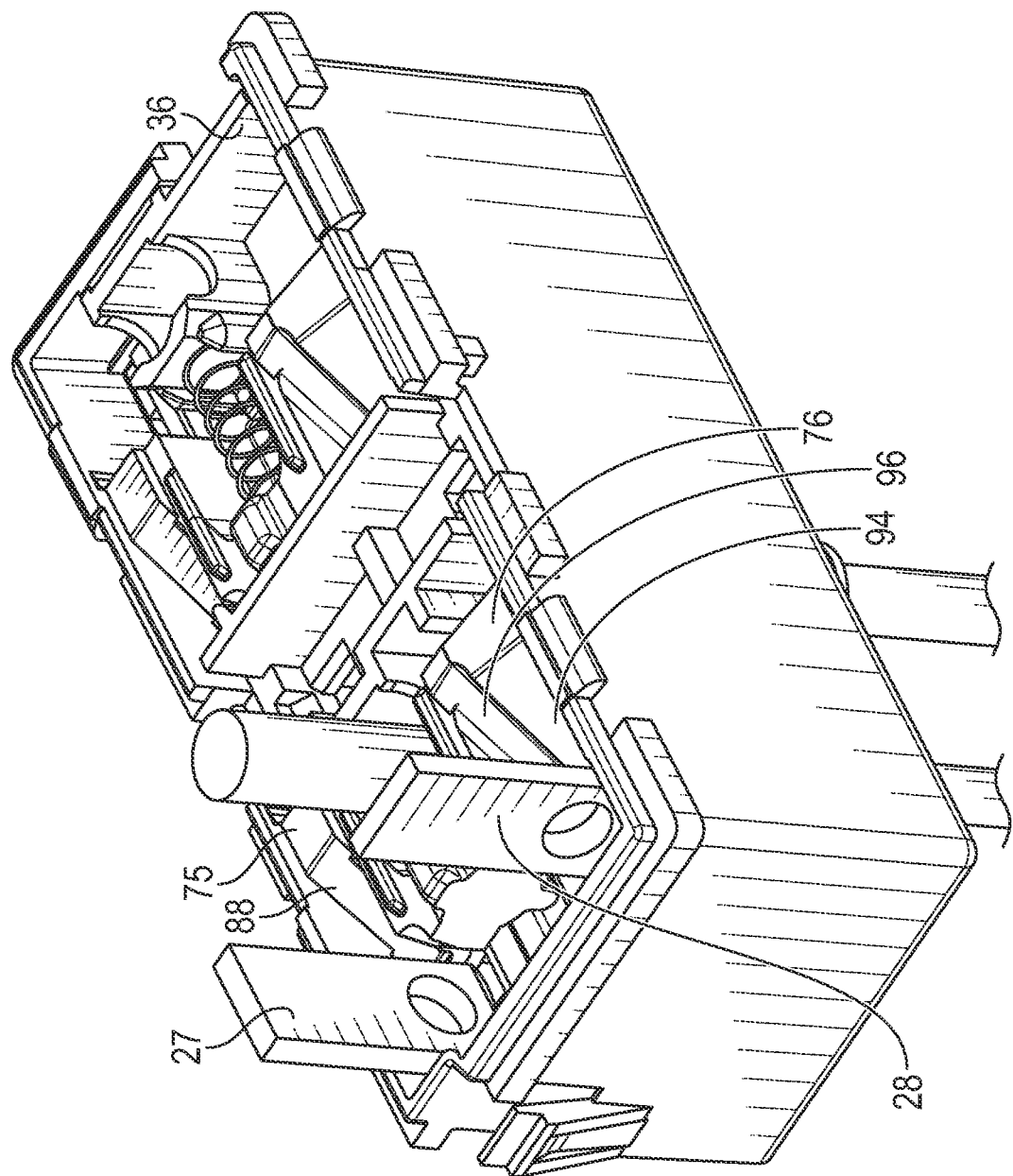
FIG. 13 is a front, top, left-hand side perspective view of the tamper resistant electrical receptacle of FIG. 1 during proper use.
Figure 14:
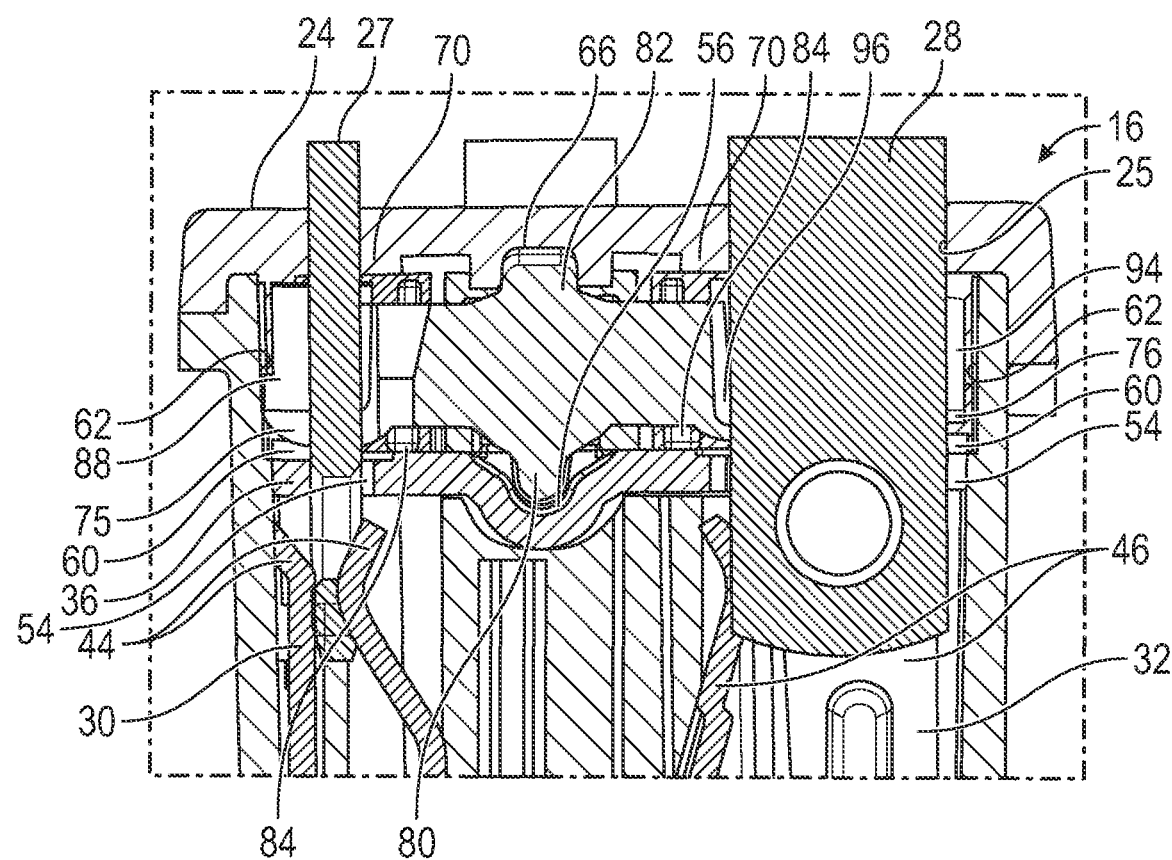
FIG. 14 is left-hand side cross-sectional view of the tamper resistant electrical receptacle of FIG. 13 during proper use.

Referring to FIGS. 13 and 14, when the electrical plug properly engages the plug outlet 16, with both the line blade 27 and neutral blade 28, respectively, being inserted into the line conductor opening 24 and neutral conductor opening 25 of the plug outlet 16, the line blade 27 contacts the sloped upper surface 88 of the line side blocking portion 75 and the neutral blade 28 contacts the sloped upper surfaces 94 and/or the sloped trough 96 of the neutral side blocking portion 76, depending upon the plug configuration. During insertion, the downward force from the line blade 27 and neutral blade 28 on the sloped upper surfaces 88, 94, 96 is evenly applied to both blocking portions 75 and 76 so the shutter 38 remains supported on the frame 36 by both support ribs 84 and the lower guide rib 80, as shown in FIG. 14. The downward force overcomes the biasing force generated by the spring 40 acting on the shutter 38 and pushes the shutter 38 in sliding movement toward the open position, in which the shutter 38 no longer blocks the cutaway openings 54 of the frame 36 corresponding to the line conductor opening 24 and neutral conductor opening 25. As the shutter 38 moves, the shutter 38 remains supported on the frame 36 by both support ribs 84 and the lower guide rib 80, allowing the shutter 38 to pass through the shutter passages 72, shown in FIG. 7, framed by the stop ribs 60 of the frame 36, stop ribs 62 of the housing 12, and stop ribs 70 of the cover 14, without contacting the stop ribs. The sliding movement of the shutter 38 is guided by the interaction between the lower guide rib 80 and the first longitudinal guide channel 56 and the upper guide rib 82 and the second longitudinal guide channel 66. The movement of the shutter 38 to the open position allows the line blade 27 and neutral blade 28 to pass through the cutaway openings 54 in the frame 38 and to contact the line contact strip 30 and neutral contact strip 32, respectively, located below the frame 36, thereby providing AC power to the electrical plug. If the electrical plug is disengaged from the plug outlet 16, the spring 40 causes the shutter 38 to slide back to the closed position, thereby blocking access to the contact arms 44 and 46 of the line contact strip 30 and neutral contact strip 32 through the cutaway openings 54.

While the shutter 38 is configured to allow access the contact arms 44 and 46 of the line contact strip 30 and neutral contact strip 32 through the cutaway openings 54 upon proper insertion of an electrical plug, as discussed above, the shutter 38 is configured to prevent such access upon improper insertion of an elongated object into only one of the line conductor opening 24 or neutral conductor opening 25 of the plug outlet 16.

Figure 15:
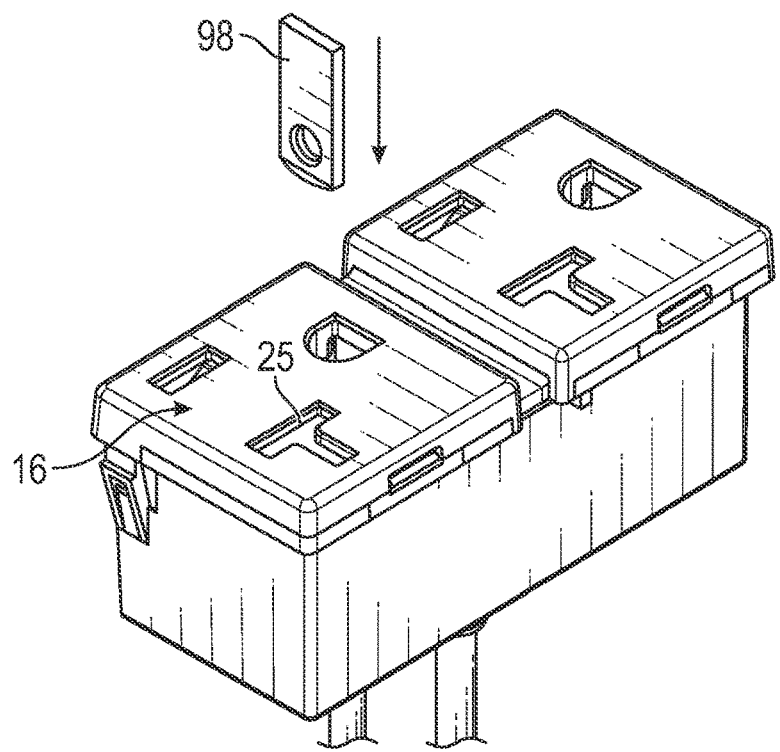
FIG. 15 is a front, top, left-hand side perspective view of the tamper resistant electrical receptacle of FIG. 1 during improper use.
Figure 16:
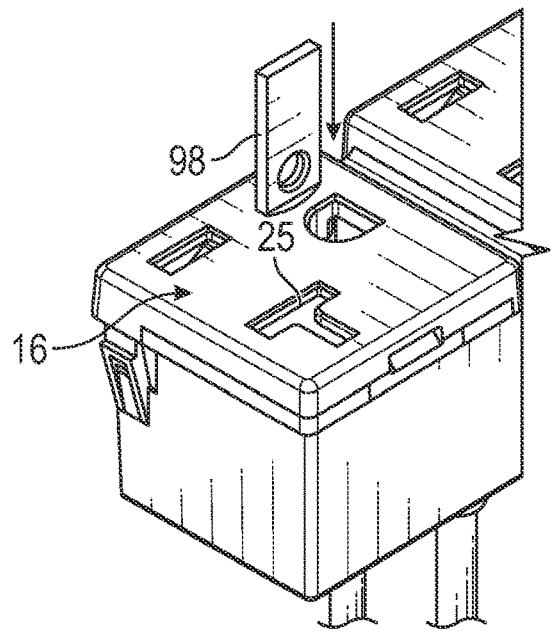
FIG. 16 is a front, top, left-hand side perspective view of the tamper resistant electrical receptacle of FIG. 1 during improper use.
Figure 17:
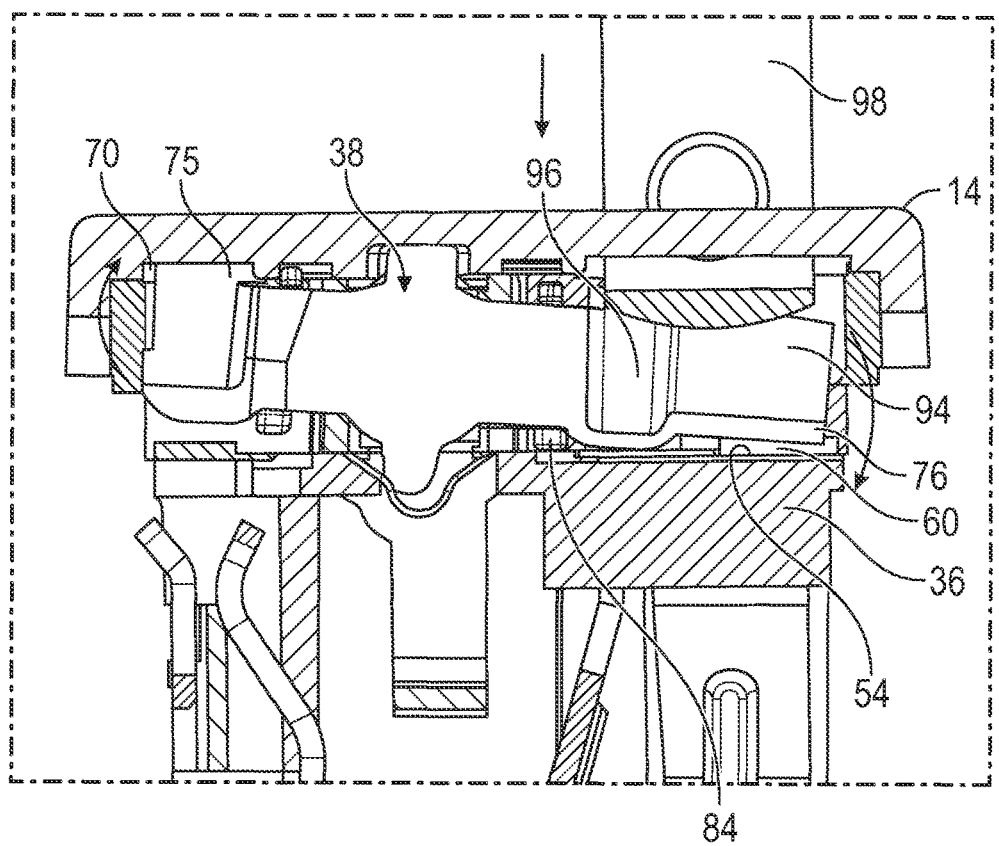
FIG. 17 is left-hand side cross-sectional view of the tamper resistant electrical receptacle of FIG. 15 during improper use.
Figure 18:
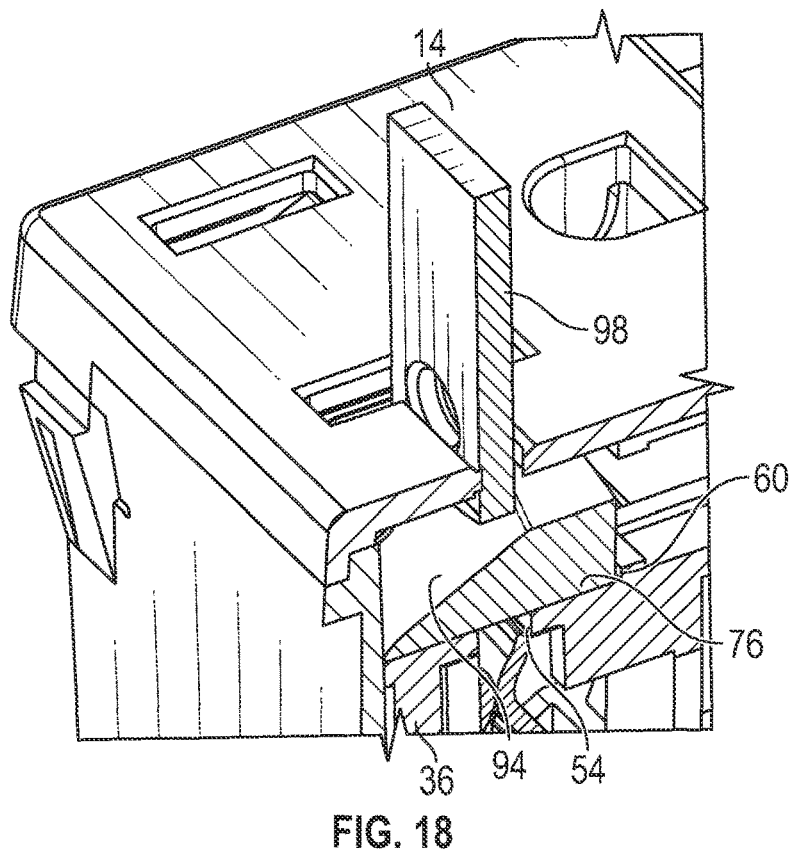
FIG. 18 is an enlarged partial cutaway front, top perspective view of the tamper resistant electrical receptacle of FIG. 15 during improper use.
Figure 19:
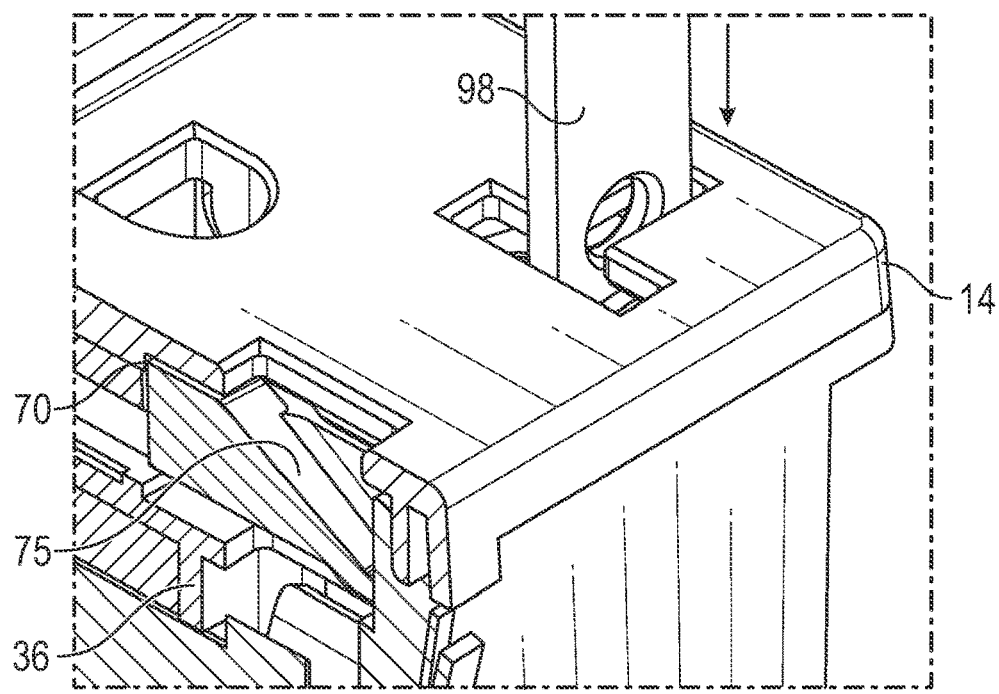
FIG. 19 is an enlarged partial cutaway rear, top perspective view of the tamper resistant electrical receptacle of FIG. 15 during improper use.
Figure 20:
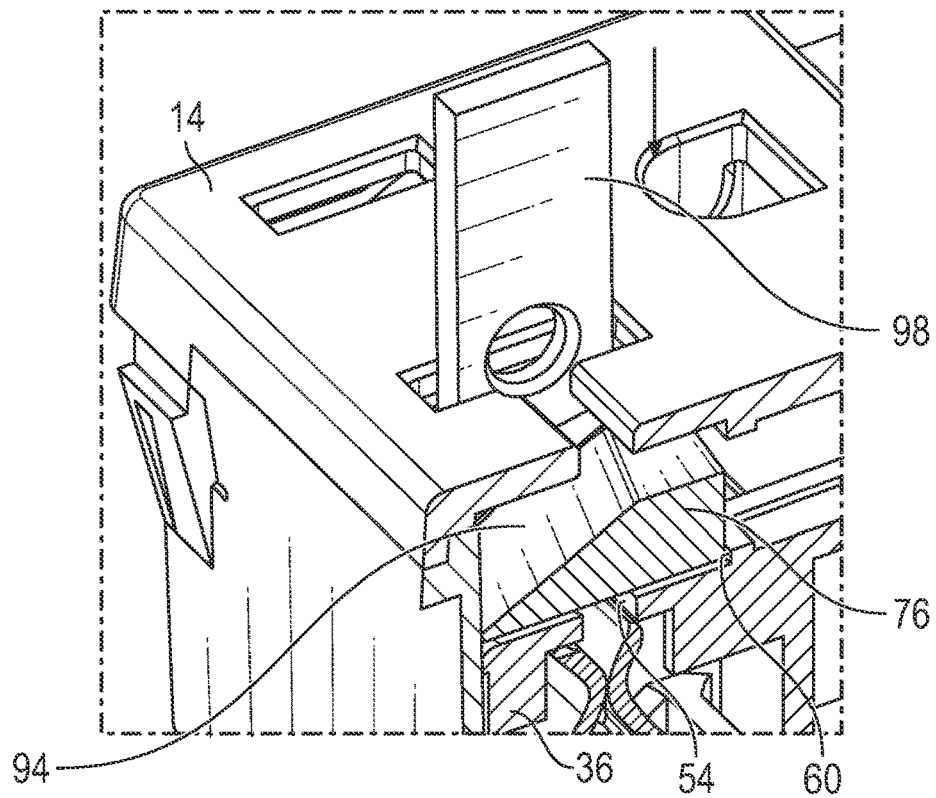
FIG. 20 is an enlarged partial cutaway front, top perspective view of the tamper resistant electrical receptacle of FIG. 16 during improper use.
Figure 21:
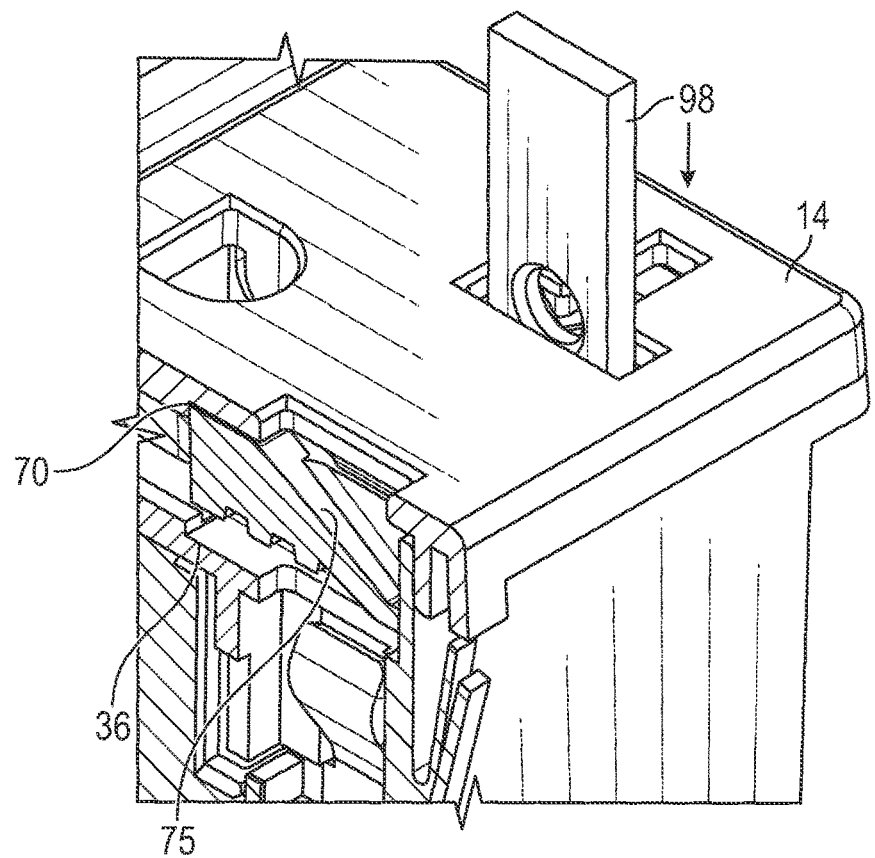
FIG. 21 is an enlarged partial cutaway rear, top perspective view of the tamper resistant electrical receptacle of FIG. 16 during improper use.

For instance, FIGS. 15 and 16 show an elongated object 98, illustrated as a plug blade for exemplary purposes, being inserted into the neutral conductor opening 25 of the plug outlet 16 in different orientations. Referring to FIG. 17, as the elongated object 98 is inserted, it contacts the sloped upper surfaces 94 and/or the sloped trough 96 of the neutral side blocking portion 76, depending upon the orientation of the elongated object 98. This results in a downward force from the elongated object 98 only on the neutral side blocking portion 76, which causes the shutter 38 to pivot on the frame 36 about the support rib 84 proximate the neutral side blocking portion 76, thereby tilting the neutral side blocking portion 76 downward and the line side blocking portion 75 upward. As seen in FIG. 17 and also FIGS. 18-21, in this tilted position, movement of the shutter 38 through the shutter passages 72, shown in FIG. 7, is prevented by the stop rib 60 of the frame 36 proximate the neutral side blocking portion 76 and the stop rib 70 of the cover 14 proximate the line side blocking portion 75. Thus, the shutter 38 remains in the closed position preventing the elongated object 98 from passing through the cutaway opening 54 corresponding to the neutral conductor opening 25 and contacting the neutral contact strip 32.

Figure 22:
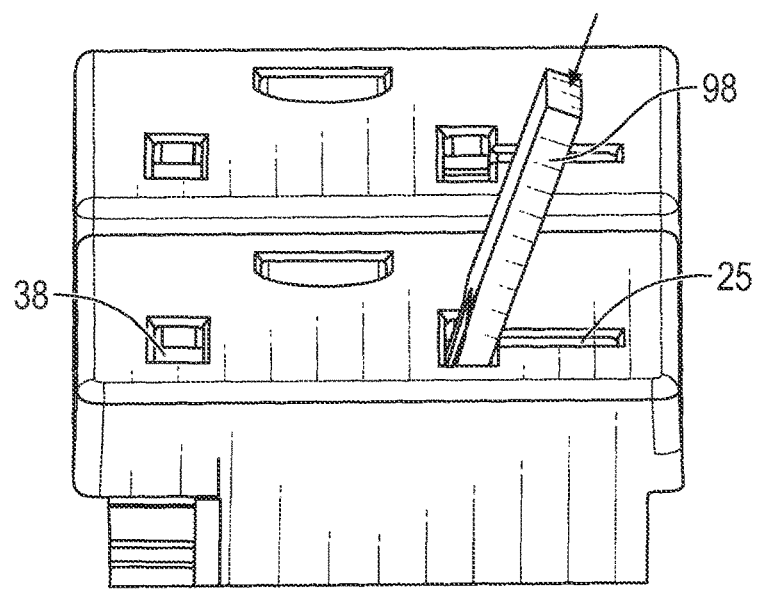
FIG. 22 is a top, left-hand side perspective view of the tamper resistant electrical receptacle of FIG. 1 during improper use.
Figure 23:
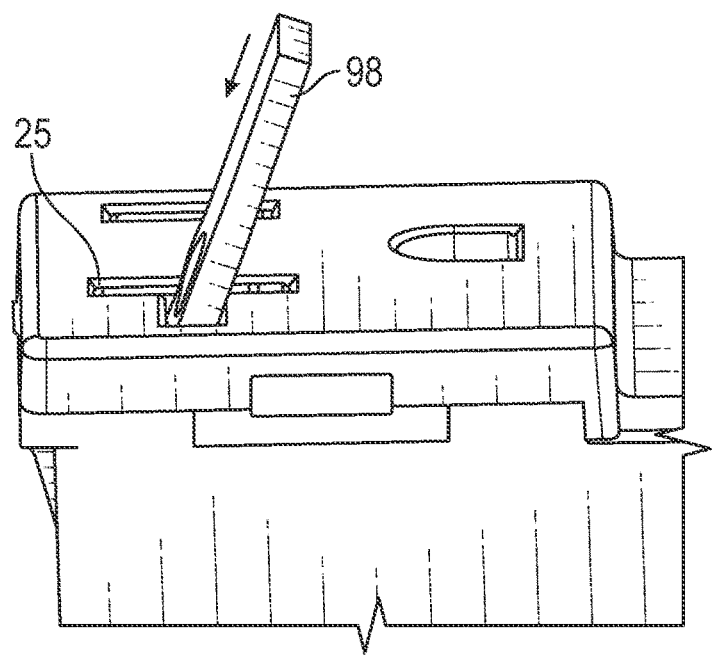
FIG. 23 is a top, front perspective view of the tamper resistant electrical receptacle of FIG. 1 during improper use.
Figure 24:
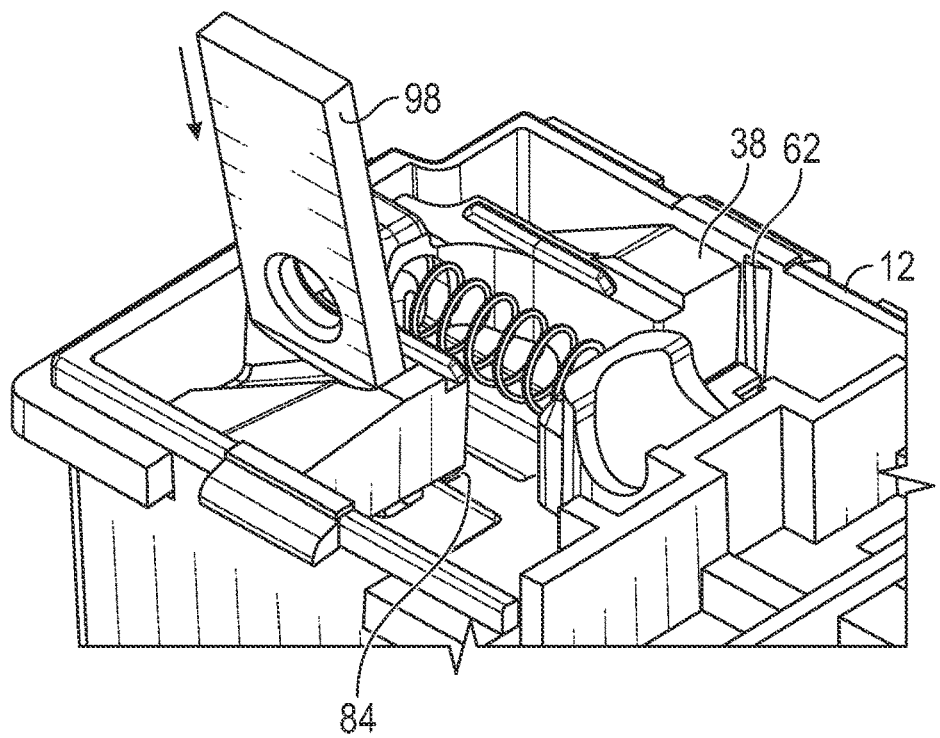
FIG. 24 is a top, front, right-hand side perspective view of the tamper resistant electrical receptacle of FIG. 22 without the cover during improper use.

Additionally, as seen in FIGS. 22-24, even if the elongated object 98 is inserted into the neutral conductor opening 25 at an inclined angle with minimal force so as not to tilt the shutter 38 about the support rib 84 as discussed above, the shutter 38 is still pushed aside into contact with one of the stop ribs 62 of the housing 12, as shown in FIG. 24. This contact with the stop rib 62 prevents movement of the shutter 38 through the shutter passages 72, shown in FIG. 7. Additionally, depending on the magnitude of the force applied by the inclined elongated object 98, the shutter 38 may tilt about the support rib 84, as discussed above, and movement of the shutter 38 may also be prevented by the stop rib 60 of the frame 36 proximate the neutral side blocking portion 76 and the stop rib 70 of the cover 14 proximate the line side blocking portion 75, as discussed above in connection with FIGS. 17-21.

Figure 25:
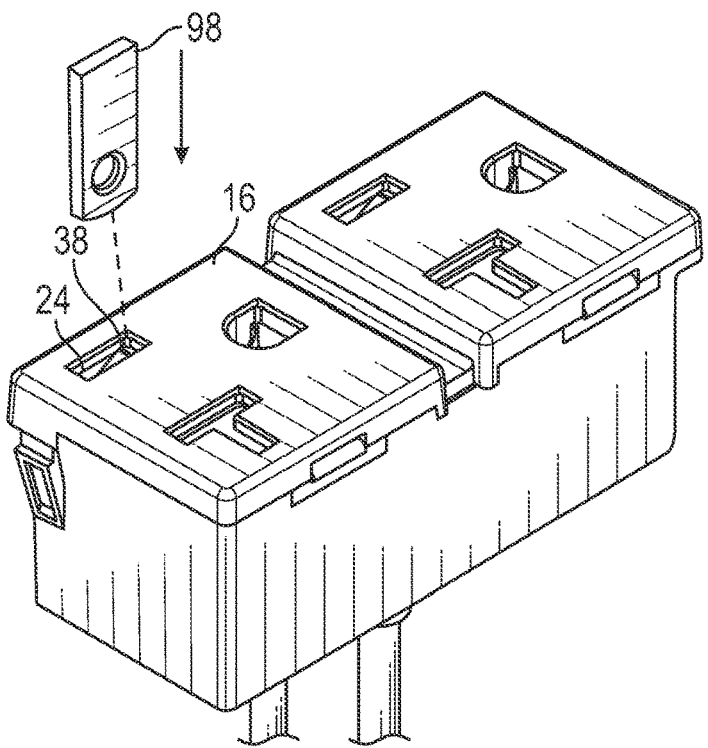
FIG. 25 is a front, top, left-hand side perspective view of the tamper resistant electrical receptacle of FIG. 1 during improper use.
Figure 26:
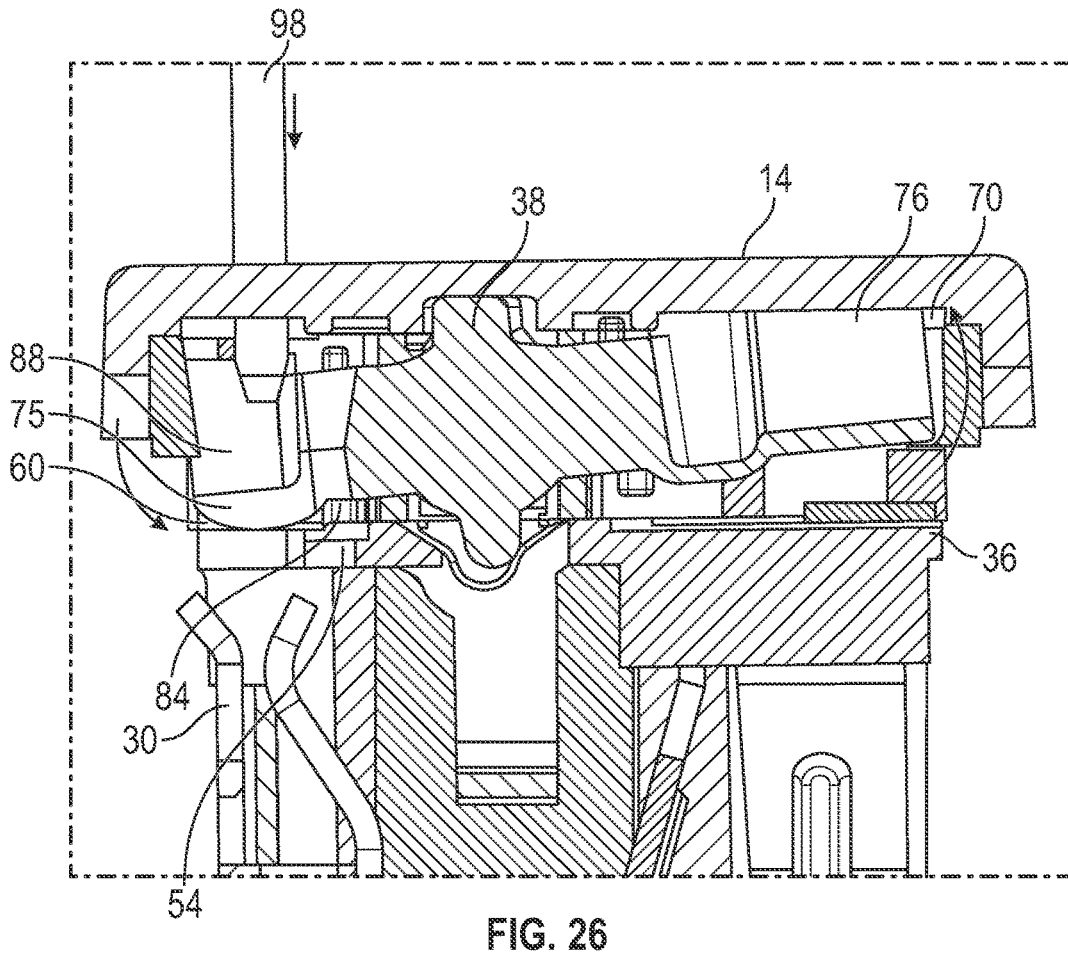
FIG. 26 is left-hand side cross-sectional view of the tamper resistant electrical receptacle of FIG. 25 during improper use.
Figure 27:
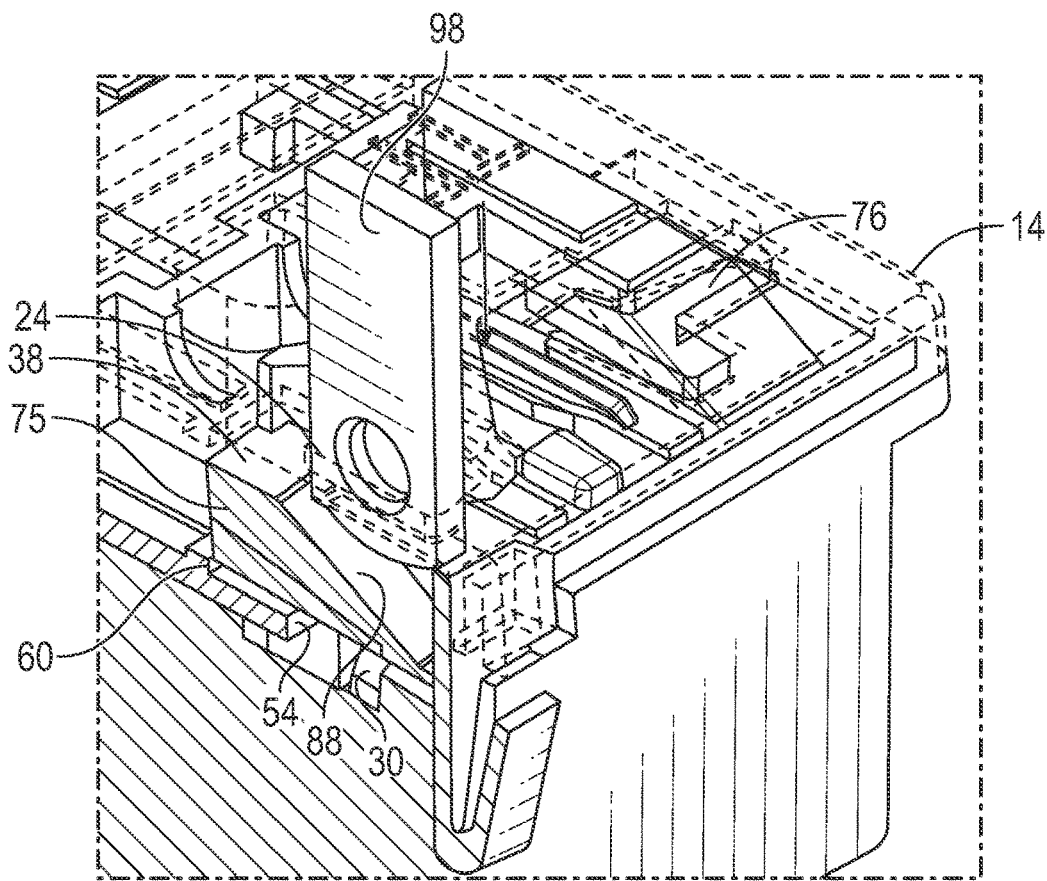
FIG. 27 is an enlarged partial cutaway rear, top perspective view of the tamper resistant electrical receptacle of FIG. 25 during improper use.
Figure 28:
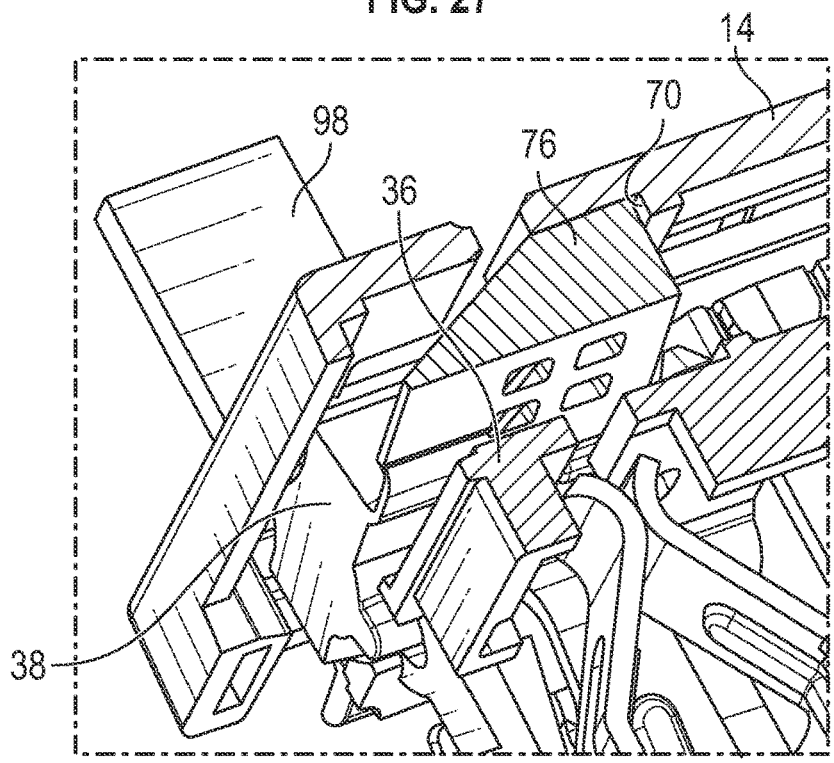
FIG. 28 is an enlarged partial cutaway front, left-hand side perspective view of the tamper resistant electrical receptacle of FIG. 25 during improper use.

Referring to FIG. 25, as discussed above, the shutter 38 is also configured to prevent access due to improper insertion of the elongated object 98 into only the line conductor opening 24 of the plug outlet 16. As seen in FIG. 26, as the elongated object 98 is inserted, it contacts the sloped upper surfaces 88 of the line side blocking portion 75. This results in a downward force from the elongated object 98 only on the line side blocking portion 75, which causes the shutter 38 to pivot on the frame 36 about the support rib 84 proximate the line side blocking portion 75, thereby tilting the line side blocking portion 75 downward and the neutral side blocking portion 76 upward. As seen in FIG. 26 and also FIGS. 27-28, in this tilted position, movement of the shutter 38 through the shutter passages 72, shown in FIG. 7, is prevented by the stop rib 60 of the frame 36 proximate the line side blocking portion 75 and the stop rib 70 of the cover 14 proximate the neutral side blocking portion 76. Thus, the shutter 38 remains in the closed position preventing the elongated object 98 from passing through the cutaway opening 54 corresponding to the line conductor opening 24 and contacting the line contact strip 30.

Figure 29:
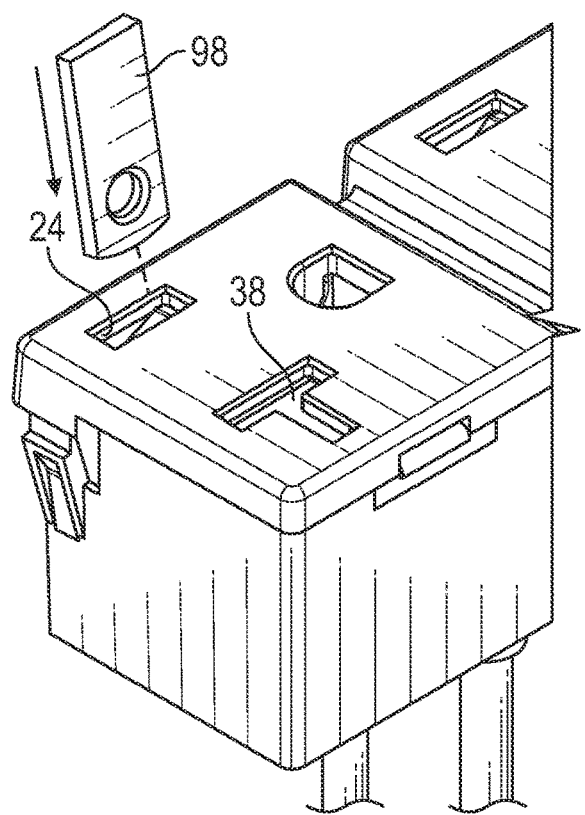
FIG. 29 is a front, top, left-hand side perspective view of the tamper resistant electrical receptacle of FIG. 1 during improper use.
Figure 30:
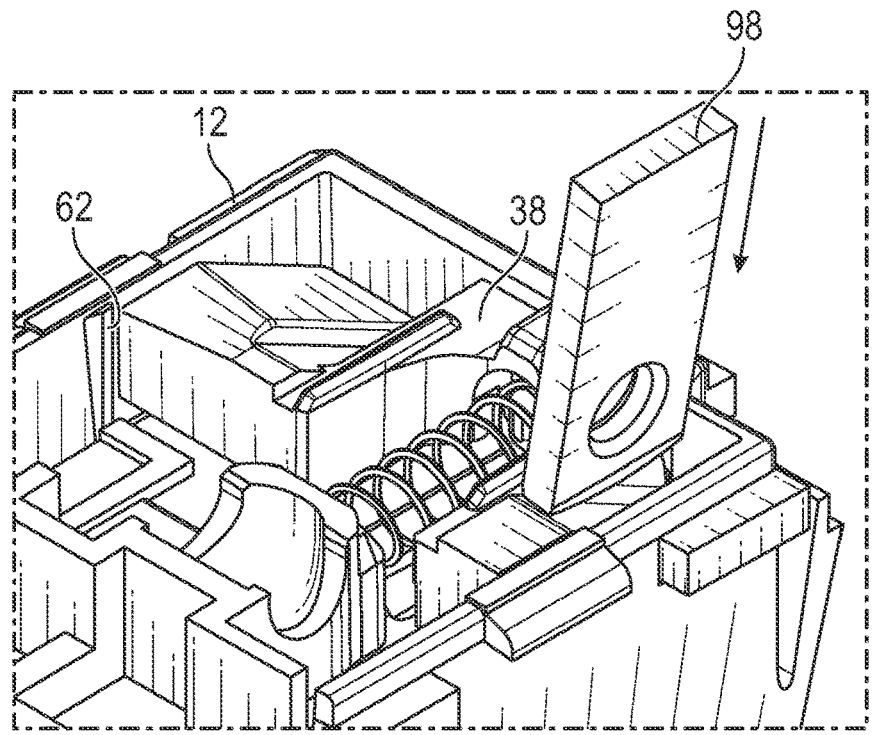
FIG. 30 is a top, rear perspective view of the tamper resistant electrical receptacle of FIG. 29 without the cover during improper use.

Additionally, as seen in FIGS. 29-30, even if the elongated object 98 is inserted into the line conductor opening 24 at an inclined angle with minimal force so as not to tilt the shutter 38 about the support rib 84 as discussed above, the shutter 38 is still pushed aside into contact with one of the stop ribs 62 of the housing 12, as shown in FIG. 30. This contact with the stop rib 62 prevents movement of the shutter 38 through the shutter passages 72, shown in FIG. 7. Additionally, depending on the magnitude of the force applied by the inclined elongated object 98, the shutter 38 may tilt about the support rib 84, as discussed above, and movement of the shutter 38 may also be prevented by the stop rib 60 of the frame 36 proximate the line side blocking portion 75 and the stop rib 70 of the cover 14 proximate the neutral side blocking portion 76, as discussed above in connection with FIGS. 26-28.

Thus, the present disclosure advantageously provides a tamper resistant electrical receptacle 10 that reduces the risk of injury associated with electrical shock and/or fire due to an object being improperly inserted into plug outlet 16 by including shutter 38 that only allows access to the electrical contact strips 30, 32 of the receptacle 10 upon simultaneous insertion of both the line and neutral blades 27, 28 of the electrical plug in the plug outlet 16. Additionally, the tamper resistant electrical receptacle 10 advantageously provides a low profile tamper resistant system suitable for a variety of electrical applications, including 20 amp receptacles for use in floor poke thru products and the like. For example, the tamper resistant electrical receptacle 10 of the present disclosure may advantageously be formed as a 1"×1" 20 amp snap-in receptacle, where space limitations of conventional 1"×1" snap-in receptacles have precluded the inclusion of tamper resistant features in the past.

While the principles of the present disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A tamper resistant electrical receptacle comprising:
   a housing including a cover having at least one plug outlet formed therethrough, the plug outlet configured to receive both line and neutral blades of an electrical plug;
   electrical contacts positioned within the housing below the at least one plug outlet, the electrical contacts being configured to be connect to AC power;
   a shutter disposed within the housing between the cover and the electrical contacts, the shutter being slidable between a closed position blocking access to the electrical contacts through the plug outlet and an open position allowing access to the electrical contacts through the plug outlet, the shutter being biased toward the closed position;
   wherein the shutter is configured to slide from the closed position to the open position only upon simultaneous insertion of both the line and neutral blades of the electrical plug in the plug outlet;
further comprising:
   a frame positioned within the housing between the electrical contacts and the cover, the frame comprising openings corresponding to the plug outlet;
   wherein the shutter is located between the frame and the cover and is slidable along an upper surface of the frame between the closed position and the open position;

wherein the frame includes a first longitudinal guide channel formed in the upper surface thereof, the first longitudinal guide channel having an axis located between the openings in the frame corresponding to the plug outlet; and wherein the shutter comprises a lower guide rib formed on its bottom surface, the lower guide rib extending downward into the first longitudinal guide channel and being slidable therein.

2. The tamper resistant electrical receptacle according to claim 1, further comprising:

a spring member biasing the shutter toward the closed position.

3. The tamper resistant electrical receptacle according to claim 1, wherein the axis of the first longitudinal guide channel is equidistant between the openings in the frame corresponding to the plug outlet.

4. The tamper resistant electrical receptacle according to claim 3, wherein the cover includes a second longitudinal guide channel formed on the lower surface thereof, the second longitudinal guide channel having an axis located between the plug outlet openings formed in the cover; and wherein the shutter comprises an upper guide rib formed on its top surface, the upper guide rib extending upward into the second longitudinal guide channel and being slidable therein.

5. The tamper resistant electrical receptacle according to claim 1, wherein the shutter comprises:

a first end configured to contact the housing in the closed position;

a second end contacting a spring member biasing the shutter toward the closed position; and at least one sloped surface on either side of the lower guide rib, each sloped surface sloping downward in a direction from the second end toward the first end.

6. The tamper resistant electrical receptacle according to claim 5, wherein the shutter comprises first and second support ribs extending downward from the bottom surface of the shutter, the first support rib being located between the lower guide rib and the at least one sloped surface on one side of the lower guide rib in a direction transverse to the axis of the first longitudinal guide channel, and the second support rib being located between the lower guide rib and the at least one sloped surface on the other side of the lower guide rib in the direction transverse to the axis of the first longitudinal guide channel; and wherein the first and second support ribs are configured to slide along the upper surface of the frame upon simultaneous insertion of both the line and neutral blades of the electrical plug in the plug outlet; and wherein the first and second support ribs are configured to form pivots about which the shutter tilts upon insertion of only one blade into the plug outlet.

7. The tamper resistant electrical receptacle according to claim 6, wherein the frame and the housing include a plurality of stop ribs configured to contact the shutter upon tilting thereof, the contact preventing the shutter from sliding from the closed position to the open position.

8. A tamper resistant electrical receptacle comprising:

a housing defining a hollow interior, the housing including a cover having at least one plug outlet formed therethrough configured to receive blades of an electrical plug;

electrical contacts positioned within the hollow interior below the at least one plug outlet;

a frame positioned within the hollow interior between the electrical contacts and the cover, the frame comprising openings corresponding to the at least one plug outlet;

a shutter disposed between the frame and the cover, the shutter being slidable along an upper surface of the frame between a closed position blocking the openings of the frame corresponding to at least one plug outlet and an open position; and a spring member biasing the shutter toward the closed position;

wherein the shutter is configured to slide from the closed position to the open position only upon simultaneous insertion of both blades of the electrical plug in the plug outlet;

wherein the frame includes a first longitudinal guide channel formed in the upper surface thereof, the first longitudinal guide channel having an axis located between the openings in the frame; and wherein the shutter comprises a lower guide rib formed on its bottom surface, the lower guide rib extending downward into the first longitudinal guide channel and being slidable therein.

9. The tamper resistant electrical receptacle according to claim 8, wherein the axis of the first longitudinal guide channel is equidistant between the openings in the frame.

10. The tamper resistant electrical receptacle according to claim 8, wherein the cover includes a second longitudinal guide channel formed on the lower surface thereof, the second longitudinal guide channel having an axis located between the plug outlet openings formed in the cover; and wherein the shutter comprises an upper guide rib formed on its top surface, the upper guide rib extending upward into the second longitudinal guide channel and being slidable therein.

11. The tamper resistant electrical receptacle according to claim 8, wherein the shutter comprises:

a first end configured to contact the housing in the closed position;

a second end contacting the spring member; and at least one sloped surface on either side of the lower guide rib, each sloped surface sloping downward in a direction from the second end toward the first end.

12. The tamper resistant electrical receptacle according to claim 11, wherein the shutter comprises first and second support ribs extending downward from the bottom surface of the shutter, the first support rib being located between the lower guide rib and the at least one sloped surface on one side of the lower guide rib in a direction transverse to the axis of the first longitudinal guide channel, and the second support rib being located between the lower guide rib and the at least one sloped surface on the other side of the lower guide rib in the direction transverse to the axis of the first longitudinal guide channel; and wherein the first and second support ribs are configured to slide along the upper surface of the frame upon simultaneous insertion of both blades of the electrical plug in the plug outlet; and wherein the first and second support ribs are configured to form pivots about which the shutter tilts upon insertion of only one blade into the plug outlet.

13. The tamper resistant electrical receptacle according to claim 12, wherein the frame and the housing include a plurality of stop ribs configured to contact the shutter upon tilting thereof, the contact preventing the shutter from sliding from the closed position to the open position.

14. A tamper resistant electrical receptacle comprising:
- a housing defining a hollow interior, the housing including a cover having first and second plug outlets formed therethrough configured to receive blades of electrical plugs;
- electrical contacts positioned within the hollow interior below the first and second plug outlets;
- a frame positioned within the hollow interior between the electrical contacts and the cover, the frame comprising openings corresponding to the first and second plug outlets;
- first and second shutters disposed between the frame and the cover, each of the first and second shutters being slidable along an upper surface of the frame between a closed position blocking the openings of the frame corresponding to one of the first and second plug outlets and an open position; and
- spring members biasing the first and second shutters toward the closed position;
- wherein each of the first and second shutters is configured to slide from the closed position to the open position only upon insertion of both blades of an electrical plug in the respective first or second plug outlet;
- wherein the frame includes a first longitudinal guide channel and a second longitudinal guide channel formed in the upper surface thereof, the first longitudinal guide channel having a first axis located between the openings in the frame corresponding to the first plug outlet and the second longitudinal guide channel having a second axis located between the openings in the frame corresponding to the second plug outlet;
- wherein the first shutter comprises a first lower guide rib formed on its bottom surface, the first lower guide rib extending downward into the first longitudinal guide channel and being slidable therein;
- wherein the second shutter comprises a second lower guide rib formed on its bottom surface, the second lower guide rib extending downward into the second longitudinal guide channel and being slidable therein; and
- wherein the axes of the first and second longitudinal guide channels are equidistant between the openings in the frame.

15. The tamper resistant electrical receptacle according to claim 14, wherein each shutter of the first and second shutters comprises:
- a first end;
- a second end contacting a spring member of the spring members; and
- at least one sloped surface on either side of the lower guide rib, each sloped surface sloping downward in a direction from the second end toward the first end.

16. The tamper resistant electrical receptacle according to claim 15, wherein each shutter comprises first and second support ribs extending downward from the bottom surface of the shutter, the first support rib being located between the lower guide rib and the at least one sloped surface on one side of the lower guide rib in a direction transverse to the axis of the longitudinal guide channel, and the second support rib being located between the lower guide rib and the at least one sloped surface on the other side of the lower guide rib in the direction transverse to the axis of the longitudinal guide channel;
- wherein the first and second support ribs are configured to slide along the upper surface of the frame upon simultaneous insertion of two blades of the electrical plug in the plug outlet;
- wherein the first and second support ribs are configured to form pivots about which the respective first or second shutter tilts upon insertion of only one blade into the plug outlet; and
- wherein the frame and the housing include a plurality of stop ribs configured to contact the first and second shutters upon tilting thereof, the contact preventing the shutters from sliding from the closed position to the open position.

* * * * *